US010701303B2

(12) United States Patent
Wang et al.

(10) Patent No.: US 10,701,303 B2
(45) Date of Patent: Jun. 30, 2020

(54) GENERATING SPATIAL AUDIO USING A PREDICTIVE MODEL

(71) Applicant: Adobe Inc., San Jose, GA (US)

(72) Inventors: Oliver Wang, Seattle, WA (US); Pedro Morgado, San Diego, CA (US); Timothy Langlois, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/937,349

(22) Filed: Mar. 27, 2018

(65) Prior Publication Data

US 2019/0306451 A1   Oct. 3, 2019

(51) Int. Cl.
*H04N 5/60* (2006.01)
*H04N 5/04* (2006.01)
*H04S 7/00* (2006.01)
*G06F 3/16* (2006.01)

(52) U.S. Cl.
CPC .............. *H04N 5/607* (2013.01); *G06F 3/16* (2013.01); *H04N 5/04* (2013.01); *H04S 7/30* (2013.01)

(58) Field of Classification Search
CPC ...... H04N 5/04; H04N 5/607; H04S 2420/01; H04S 1/002; H04S 1/005; H04S 3/002; H04S 3/004; H04S 7/30; H04S 7/302; H04S 7/303; H04S 7/304; G06F 3/16; G06F 3/162; G06F 3/165; G06F 3/167
See application file for complete search history.

(56) References Cited

U.S. PATENT DOCUMENTS

| | | | | |
|---|---|---|---|---|
| 2008/0193016 | A1* | 8/2008 | Lim ................... | G06K 9/00711 382/190 |
| 2009/0238371 | A1* | 9/2009 | Rumsey ............... | H04R 29/001 381/58 |
| 2010/0309390 | A1* | 12/2010 | Plut ..................... | H04N 9/3147 348/744 |
| 2014/0363138 | A1* | 12/2014 | Coviello ............... | G11B 27/28 386/241 |
| 2017/0188168 | A1* | 6/2017 | Lyren ..................... | H04S 1/007 |

(Continued)

OTHER PUBLICATIONS

Gerzon, Michael, A., "Periphony: With-Height Sound Production", J. Audio Engineering Society, vol. 21, Issue 1, Feb. 1973, 1 page.

(Continued)

*Primary Examiner* — Andrew C Flanders
(74) *Attorney, Agent, or Firm* — Kilpatrick Townsend & Stockton LLP

(57) ABSTRACT

Certain embodiments involve generating and providing spatial audio using a predictive model. For example, a generates, using a predictive model, a visual representation of visual content provideable to a user device by encoding the visual content into the visual representation that indicates a visual element in the visual content. The system generates, using the predictive model, an audio representation of audio associated with the visual content by encoding the audio into the audio representation that indicates an audio element in the audio. The system also generates, using the predictive model, spatial audio based at least in part on the audio element and associating the spatial audio with the visual element. The system can also augment the visual content using the spatial audio by at least associating the spatial audio with the visual content.

18 Claims, 8 Drawing Sheets

(56) References Cited

U.S. PATENT DOCUMENTS

| | | | | |
|---|---|---|---|---|
| 2017/0366896 A1* | 12/2017 | Adsumilli | .............. | H04R 1/406 |
| 2018/0139565 A1* | 5/2018 | Norris | .................... | H04S 7/304 |
| 2018/0225805 A1* | 8/2018 | Brandt | ................. | H04N 5/2258 |
| 2018/0295463 A1* | 10/2018 | Eronen | ................. | H04R 3/005 |
| 2019/0110148 A1* | 4/2019 | Song | ........................ | H04S 5/00 |

OTHER PUBLICATIONS

He, Kaiming, et al., "Deep Residual Learning for Image Recognition", In Proceedings of the IEEE Conference on Computer Vision and Pattern Recognition, Jun. 2016, 9 pages.

Krizhevsky, Alex, et al. Imagenet Classification With Deep Convolutional Neural Networks, Advances in Neural Information Processing Systems 25, 2012, 9 pages.

Nachbar, Christian, et al., "Ambix—A Suggested Ambisonics Format", Ambisonics Symposium, Lexington, Jun. 2011, 11 pages.

Oord, Aaron Van Den, et al., "Wavenet: A Generative Model for Raw Audio", arXiv preprint arXiv: 1609.03499, Sep. 2016, 15 pages.

\* cited by examiner

GENERATING SPATIAL AUDIO USING A PREDICTIVE MODEL

TECHNICAL FIELD

This disclosure generally relates to audio conversion tools and more specifically to tools for generating spatial audio signals using a predictive model.

BACKGROUND

Many modern devices can be used to provide visual content to a user such as, for example, a virtual reality environment that can simulate the user's three-dimensional physical presence and environment and allow the user to interact with virtual objects or elements in the simulated environment or an augmented reality environment. In some instances, audio feedback (e.g., sounds) associated with the visual content (e.g., a three-dimensional video, three-dimensional animations, etc.) can be provided to the user, along with the visual content.

In some instances, providing visual content may necessitate providing three-dimensional audio feedback (e.g., audio feedback that conveys a location of a sound source in the visual content). For example, if a user is interacting with a virtual reality environment that includes various virtual characters that are speaking, comprehensive audio feedback should allow a user to perceive audio from a first virtual character as being louder as the user turns towards the first virtual character and perceive audio from the other virtual characters as being lower as the user turns away from the other virtual characters.

However, current solutions for capturing and generating audio feedback for visual content are limited. For instance, some existing systems for capturing and providing spatial (e.g., three-dimensional) audio signals for visual content may necessitate equipment or tools that may be expensive, complex, or unavailable. As an example, visual content can be captured using a mobile phone and uploaded to content data networks, such as, YouTube. However, a user viewing the visual content is not provided with spatial (e.g., three-dimensional) audio feedback when the user is viewing the visual content.

Moreover, conventional systems and methods for capturing and providing audio feedback for visual content may be limited to capturing and outputting signals that are one-dimensional or two-dimensional, which may not convey a perception or sensation of a location, depth, or position of a sound source in the visual content. In some instances, outputting one or two-dimensional audio feedback can create the impression that all audio content or feedback associated with the visual content comes from a particular point (e.g., originates from the same point in a virtual reality environment). Thus, two different sounds associated with two different elements of a virtual reality environment would be perceived by a user as originating from the same point in a space (e.g., from the same point in the virtual reality environment). In still another example, outputting one or two-dimensional audio feedback can cause a user to perceive the location of two different sounds independent of the user's viewing direction.

Thus, some existing systems and methods for generating and providing audio for visual content (e.g., a virtual reality environment) provide an experience that is one-dimensional or two-dimensional from the user's perspective. As a result, the user may not experience a three-dimensional auditory sensation when viewing or interacting with the visual content.

Therefore, some existing systems and methods for capturing, generating, and providing audio feedback for visual content present disadvantages such as, but not limited to, those discussed above. For these and other reasons, improved techniques and systems for capturing, generating, and providing audio feedback for visual content are therefore desirable.

SUMMARY

Various embodiments of the present disclosure provide systems and methods for generating and providing spatial (e.g., ambisonic) audio using a predictive model.

In one example, a method for generating spatial audio includes generating, by a processor and using a predictive model, a visual representation of visual content provideable to a user device by encoding the visual content into the visual representation that indicates a visual element in the content. The method also includes generating, by the processor and using the predictive model, an audio representation of audio associated with the visual content by encoding the audio into the audio representation that indicates an audio element in the audio. The method also includes generating, by the processor and using the predictive model, spatial audio based at least in part on the audio element and associating the spatial audio with the visual element. The method also includes augmenting, by the processor, the visual content using the spatial audio by at least associating the spatial audio with the content.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

DETAILED DESCRIPTION

Figure 1:
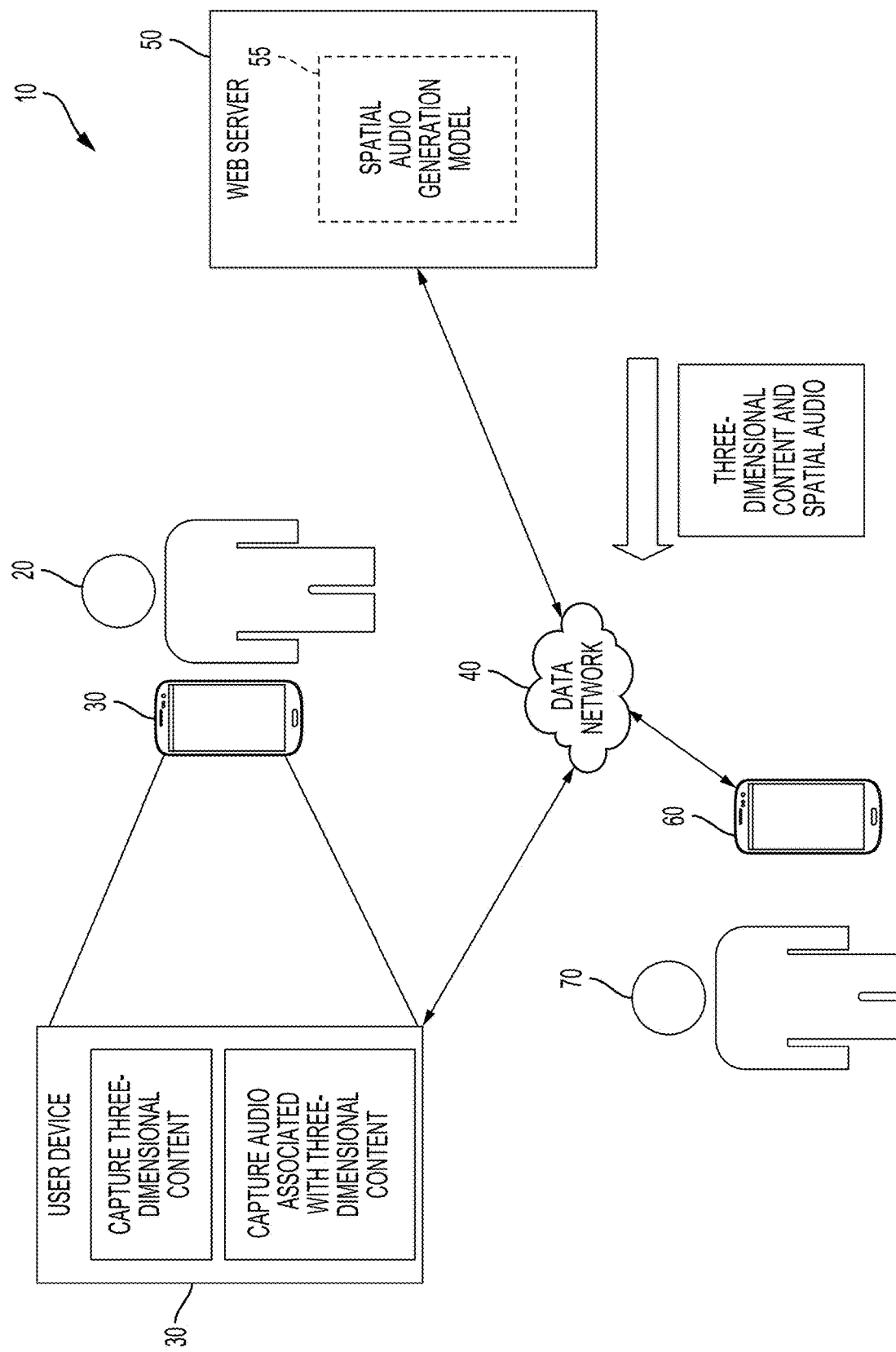
FIG. 1 is a block diagram of an exemplary environment in which a spatial audio generation model generates spatial audio signals in accordance with one or more embodiments.

Various aspects and features of the present disclosure relate to using a predictive model (e.g., a neural network, deep learning model, etc.) to generate spatial (e.g., three-dimensional) audio from non-spatial audio (e.g., one-dimensional audio or two-dimensional audio such as mono or stereo audio) or generate high order (e.g., second order) spatial audio from low order (e.g., first order) spatial audio. Spatial audio can include any three-dimensional audio including, for example, ambisonic audio. For instance, stereo or mono audio signals can be input into a spatial audio system that uses one or more neural networks to generate and output spatial audio signals using the stereo audio signals. The generated ambisonic audio signals can be associated with visual content (e.g., a virtual reality environment) and indicate a location, depth, or position of a sound source in the visual content (e.g., indicate the visual location of the sound source in the visual content). For example, the generated ambisonic audio signals can describe various sounds in all viewing directions of the visual content. The visual content, along with the ambisonic audio signals, can then be output to a user via a user device.

Embodiments of the present disclosure provide advantages over previous solutions. For example, systems described herein provide the ability to use commonly available equipment or tools (e.g., a mobile phone) to capture non-spatial audio (e.g., stereo or mono audio) for visual content. The non-spatial audio can be converted to ambisonic audio using a predictive model and the ambisonic audio can be provided to a user, along with the visual content. In this manner, embodiments described herein improve the presentation of visual content to a user by allowing the user to experience an immersive auditory sensation when viewing or interacting with the visual content. Additionally, embodiments of the present disclosure increase the corpus of usable audio for visual content.

In one illustrative example, a user can use a user device (e.g., a mobile device that includes a 360 degree camera) to capture visual content, along with mono audio of the visual content. The visual content can include, for example, a three-dimensional video. In this example, a spatial audio system executed on the user device can use a predictive model to analyze the visual content and the mono audio and generate spatial audio signals using the mono audio. Continuing with this example, the user can then upload the visual content and the ambisonic audio signals to a content data network, such as, YouTube.

The following non-limiting example is provided to introduce certain embodiments. A spatial audio system obtains (e.g., receives) data indicating content that can be provided to a user. Examples of the content can include text, images, videos, animations, simulated environments (e.g., virtual or augmented reality environments), characters, virtual objects, sounds, etc. As an example, the spatial audio system obtains data indicating a virtual reality environment and an audio file associated with the virtual reality environment (e.g., one or more stereo or mono audio signals associated with various frames of the virtual reality environment).

The spatial audio system analyzes the content and extracts or generates visual representations from the content. For example, the spatial audio system obtains data indicating various frames of the virtual reality environment, analyzes each frame, and generates a visual representation of the frame that describes, indicates, or otherwise represents elements (e.g., visual elements) in the frame. As an example, a frame of the virtual reality environment includes a virtual character and the spatial audio system analyzes the frame and generates a visual representation of the frame that indicates that the frame includes the virtual character. In some examples, a visual representation can indicate a position or location of a visual element in the content. For instance, the spatial audio analyzes the frame of the virtual reality environment that includes the virtual character and generates a visual representation that indicates that the frame includes the virtual character and the visual location or position of the virtual character within the virtual reality environment. In some examples, the spatial audio system can extract or generate a visual representation from content by using an encoder that includes one or more trainable predictive models that can be used to encode a frame of the content into a visual representation that indicates visual elements in the frame.

Continuing with this example, the spatial audio system also analyzes the content and extracts or generates audio representations from the content. For example, the spatial audio system analyzes one or more audio signals associated with the virtual reality environment and generates an audio representation of the stereo signal that describes, indicates, or otherwise represents the audio signal, a sound associated with the audio signal, or an element in the audio signal. As an example, the spatial audio system obtains data indicating that a stereo audio signal associated with the virtual reality environment corresponds to the virtual character making a sound in the virtual reality environment. The spatial audio system can analyze the stereo audio signal and generate an audio representation of the stereo audio signal that indicates that the stereo audio signal corresponds to the virtual character making a sound. In some examples, the spatial audio system can extract or generate an audio representation by using an encoder that includes one or more trainable predictive models (e.g., a fully connected convolutional neural network) that can be used to encode an audio signal into an audio representation that corresponds to a sound associated with the audio signal.

In some examples, the spatial audio system generates visual and audio representations as described above and the visual or audio representations can indicate a position or location of a sound source in the content. For instance, the spatial audio system can analyze the frame of the virtual reality environment that includes the virtual character making a sound and generate a visual representation and an audio representation that indicate that the frame includes the virtual character and the visual location or position of the sound source (e.g., the position or location of the virtual character within the virtual reality environment).

The spatial audio system can generate one or more spatial audio signals for the content based on the visual representations, audio representations, and/or the audio file associated with the content (e.g., one or more stereo audio signals associated with the content). For example, the spatial audio system includes a synthesizer and the various visual and audio representations can be input into the synthesizer, along with the audio file. The synthesizer can separate the audio file into various individual audio signals. For instance, if a portion of the audio file includes different audio signals corresponding to various virtual characters speaking in the virtual reality environment, the synthesizer can separate the various audio signals into individual audio signals (e.g., separate each audio signal or group of audio signals corresponding to each character speaking). In this example, the synthesizer can then determine or predict a weight (e.g., a weight value) to be applied to each audio signal. In some examples, the synthesizer determines or predicts a weight for an audio signal based on a position or location of a source of the sound that corresponds to the audio signal (e.g., a visual position or location of the sound source indicated by a visual or audio representation associated with the audio signal). In some examples, the determined or predicted weight can be a weight that, when applied to the audio signal, localizes the audio signal such that the weighted audio signal, when played, can be perceived as originating from the location or position of the source of the sound. For instance, if the audio signal is associated with a sound made by a virtual character positioned behind the user in the virtual reality environment, the synthesizer can determine a weight value to be applied to the audio signal such that the weighted stereo audio signal, when played can be perceived as originating from the location of the source of the sound that corresponds to the audio signal (e.g., perceived as originating from behind the user).

To generate a spatial audio signal for the content, the synthesizer applies one or more algorithms such as for example, a linear model, to an audio signal and the corresponding weight for the audio signal. The one or more algorithms can be applied to the audio signal and the corresponding weight to generate a spatial audio signal, which when played, can sound or be perceived as originating from a source at a particular location with respect to the user (e.g., originating from the location or position of the source of a sound corresponding to the audio signal). In this example, the spatial audio system can augment the content by adding the spatial audio signals to the content, embedding the spatial audio signals into the content, or otherwise associating spatial audio signals with the content. For example, the spatial audio system augments the virtual reality environment by associating the virtual reality environment with a spatial audio file that includes one or more spatial audio signals corresponding to various frames of the virtual reality environment, which allows the virtual reality environment to be aurally enhanced for a user if the user is viewing or interacting with the virtual reality environment. For instance, as the user interacts with the virtual reality environment, various sounds from characters or elements within the virtual reality environment can be output (e.g., via a virtual reality device or any user device) as spatial sounds such that they can be perceived by the user as originating from the position or location of the characters or elements within the virtual reality environment.

In this manner, the spatial audio system uses one or more predictive models to convert non-spatial audio (e.g., one-dimensional audio signals or two-dimensional audio signals such as stereo or mono audio signals) to spatial audio signals, which when played, indicate the locations of various sound sources in the content to allow the user to experience a three-dimensional and immersive auditory sensation when viewing or interacting with the content.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a block diagram of an exemplary environment 10 in which a spatial audio generation model 55 generates spatial audio signals in accordance with one or more embodiments.

In the example depicted in FIG. 1, a user 20 can use a user device 30 (e.g., a mobile device that includes a camera) to capture visual content (e.g., a video of the user's environment), along with non-spatial audio of the visual content (e.g., one-dimensional audio or two-dimensional audio such as stereo or mono audio of the visual content). Visual content can include any content that can be viewed by a user including, for example, a three-dimensional video, a three-dimensional animation, a simulated environment (e.g., a virtual or an augmented reality environment, etc.). In this example, the user can transmit data indicating the visual content and the audio to a web server 50 (e.g., a computing device) via a data network 40. The web server 50 can include the spatial audio generation model 55, which can be executed by a processor of the web server 50. The web server 50 can receive the data indicating the visual content and the audio and the processor of the web server can execute the spatial audio generation model 55 to convert the one-dimensional or two-dimensional audio to spatial audio (e.g., three-dimensional audio) using one or more predictive models. In this example, the web server 50 can generate a multimedia file by augmenting the visual content using the spatial audio. Augmenting the visual content can include adding the spatial audio to the content, embedding the spatial audio into the content, or otherwise associating the spatial audio with the content. In some examples, the multimedia file can include a mapping or association between the visual content and the spatial audio. The web server 50 can then transmit the multimedia file to a user device 60 associated with another user 70 via the data network 40. In this example, the user 70 can receive the multimedia file and view the augmented visual content via the user device 60. As the user views the augmented visual content, the spatial audio can be output such that various sounds from visual elements in the augmented visual content can be perceived by the user 70 as originating from the visual position or location of the visual elements within the augmented visual content.

Figure 2:
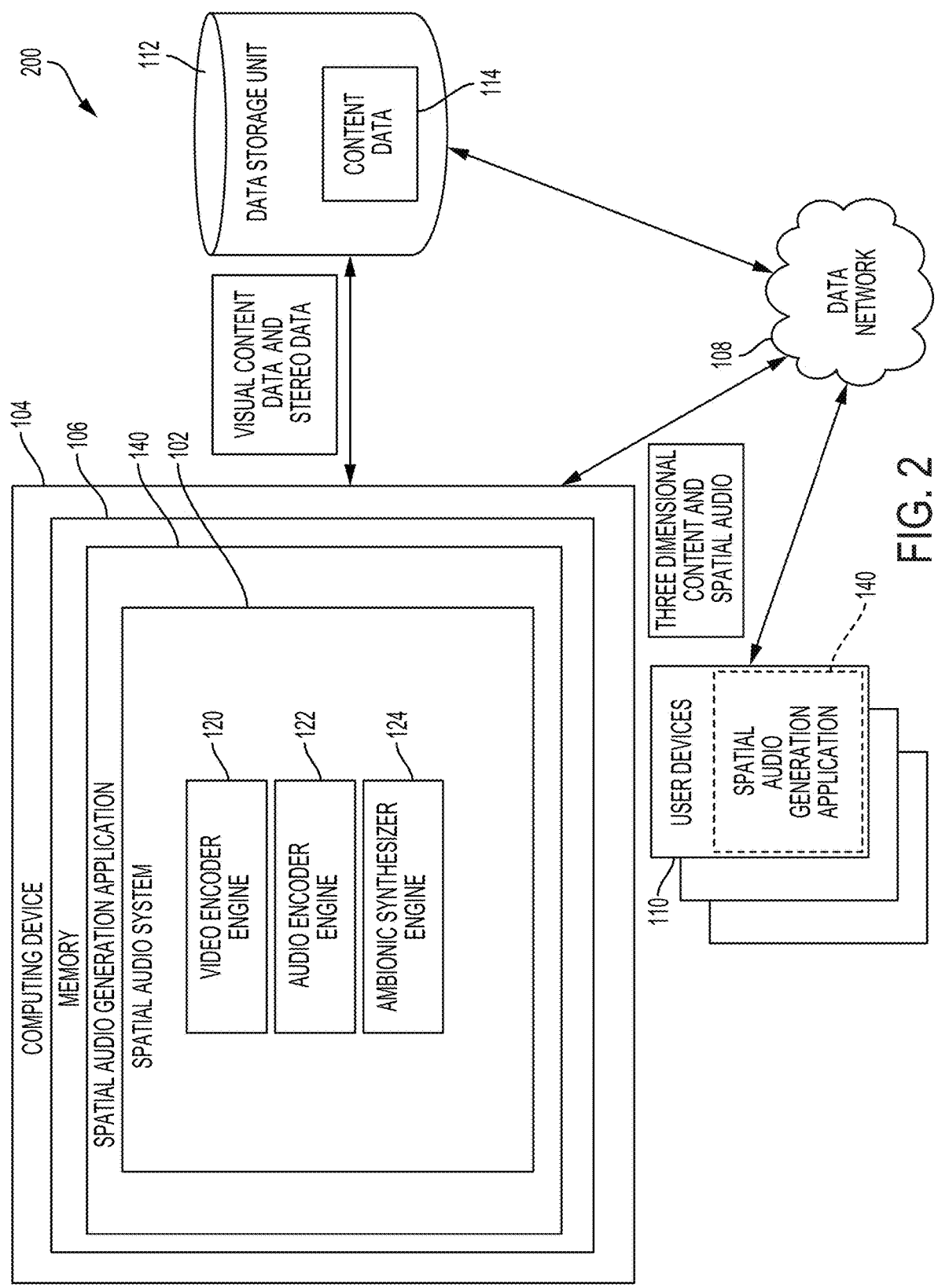
FIG. 2 is a block diagram of an exemplary environment in which a spatial audio system generates spatial audio signals in accordance with one or more embodiments.

FIG. 2 is a block diagram of an exemplary environment 100 in which a spatial audio system 102 generates spatial audio signals in accordance with one or more embodiments. Spatial audio signals can include any three-dimensional audio signals including, for example, ambisonic audio. The environment 100 includes the spatial audio system 102, one or more computing devices 104, one or more user devices 110, and one or more data storage units 112. The spatial audio system 102 and computing devices 104, the user devices 110, and the data storage unit 112 are communicatively coupled via one or more data networks 108 (e.g., the Internet, one or more local area networks ("LAN"), one or more wired area networks, or some combination thereof).

In some embodiments, a user of the computing device 104 visits a webpage or an application store to explore applications supported by the spatial audio system 102. The spatial audio system 102 provides the applications as a software as service ("SaaS"), or as a standalone application that may be installed on the computing device 104, or as a combination.

In some embodiments, the computing device 104 represents various types of devices. For example, the computing device 104 is a mobile device (e.g., a mobile telephone, a smartphone, a PDA, a tablet, a laptop, a camera, a tracker, a watch, a wearable device, etc.). The computing device 104, however, in some embodiments, is a non-mobile device (e.g., a desktop computer or another type of client device). In this example, the spatial audio system 102 is implemented on, executed by, or stored on one or more computing devices 104. For example, the spatial audio system 102 is stored on a memory device 106 of the computing device 104. In some embodiments, the spatial audio system 102 is executed on the one or more computing devices 104 via a spatial audio generation application 140.

In some embodiments, the user devices 110 can be any type of client device and may include a spatial audio generation application 140. In this example, one or more components of the spatial audio system 102 may be stored on, implemented on, or executed by the user devices 110.

The data storage unit 112 stores content data 114 that includes various content that can be provided to a user. The content can include, but is not limited to, text, images, videos, animations, simulated environments (e.g., virtual or augmented reality environments), characters, virtual objects, sounds, etc. In some examples, the content can include any sequence of images or frames such as, for example, a video stream or a simulated environment. In some examples, the content data 114 includes audio data associated with the content. The audio data or file can indicate one or more stereo or one-dimensional audio signals or sounds in one or more frames of the content. The content data 114 can be obtained from the computing device 104, the user device 110, via user input (e.g., if a user programs the data storage unit 112 to include the content data 114), or any other source. In some examples, the computing device 104 or the user device 110 can be communicatively coupled to the data storage unit 112 and the computing device 104 or user device 110 receives or obtains content data 114 from the data storage unit 112 via the data network 108 or a direct connection. In another embodiment, the computing device 104 or the user device 110 includes the data storage unit 112 and can access the content data 114. In another embodiment, the computing device 104 is communicatively coupled to the user device 110 and receives or obtains content data 114 from the user device 110.

In some embodiments, computing device 104 includes the spatial audio generation application 140, which can include one or more instructions stored on a computer-readable storage medium and executable by one or more processors of the computing device 104, the user device 110, or any other device. When executed by the one or more processors, the computer-executable instructions of the spatial audio generation application 140 cause the spatial audio system 102 to generate a spatial audio signal.

In some embodiments, the computing device 104 executes the spatial audio system 102. The spatial audio system 102 includes a video encoder engine 120, an audio encoder engine 122, and an ambisonic synthesizer engine 124, which can each be executed on the computing device 104. For example, the engines 120, 122, 124 each include one or more instructions stored on a computer-readable storage medium and executable by processors of the computing device 104. When executed by the one or more processors, the computer-executable instructions of the spatial audio system 102 (e.g., the instructions of the engines 120, 122, 124) cause the spatial audio system 102 to generate three-dimensional audio signals (e.g., spatial audio signals) such as, for example, by converting stereo, mono, or one-dimensional audio signals to spatial audio signals.

For example, the spatial audio generation application 140 causes the spatial audio system 102 to obtain (e.g., receive) content data 114 indicating content to be provided to a user of the computing device 104. In some examples, the spatial audio generation application 140 causes the spatial audio system to obtain the content data 114 from the data storage unit 112, the user device 110, via user input (e.g., if a user programs the computing device 104 to include the content data 114), or any other source. The content data 114 can include content that can be provided to a user such as, for example, visual content (e.g., a virtual or augmented reality environment). In some examples, the spatial audio generation application 140 causes the spatial audio system 102 to obtain or receive audio data associated with the content from the data storage unit 112, the user device, via user input (e.g., if a user programs the computing device 104 to include the audio data), or any other source. The audio data or file associated with the content can indicate one or more stereo audio signals or sounds in the content.

In some embodiments, the video encoder engine 120 analyzes the content obtained by the spatial audio system 102 and extracts or generates one or more visual representations based on the content. In some examples, a visual representation of the content describes, indicates, or otherwise represents visual elements of the content. For example, the video encoder engine 120 receives content data 114 indicating various frames of a virtual reality environment. The video encoder engine 120 analyzes one or more of the frames and generates a visual representation of the frame that describes, indicates, or otherwise represents elements in the frame. As an example, a frame of the virtual reality environment includes a virtual character and the video encoder engine 120 analyzes the frame and generates a visual representation of the frame that indicates that the frame includes the virtual character. In some examples, a visual representation can indicate a position or location of an element in the content. As an example, the video encoder engine 120 can analyze the frame of the virtual reality environment that includes the virtual character and generate a visual representation that indicates that the frame includes the virtual character and the location or position of the virtual character within the frame or the virtual reality environment. In some examples, the video encoder engine 120 can extract or generate a video feature representation by using one or more predictive models that can be used to encode a frame of the content into a visual representation that describes, indicates, or otherwise represents elements of the content.

The audio encoder engine 122 analyzes the audio data associated with the content and extracts or generates one or more audio representations based on the audio data. In some examples, an audio representation describes, indicates, or otherwise represents a stereo or mono audio signal, a sound in the content, or an audio element in the audio data. For example, the audio encoder engine 122 receives content data 114 indicating various stereo audio signals associated with various frames of the virtual reality environment. The audio encoder engine 122 analyzes one or more of the stereo audio signals and generates an audio representation of the stereo audio signal that describes, indicates, or otherwise represents the stereo audio signal or a sound associated with the stereo audio signal. As an example, the audio encoder engine 122 receives data indicating a stereo audio signal associated with the virtual reality environment that corresponds to the virtual character making a sound in a frame of the virtual reality environment. The audio encoder engine 122 can analyze the stereo audio signal and generate an audio representation of the stereo audio signal that indicates that the stereo audio signal corresponds to the virtual character making a sound. In some examples, the audio encoder engine 122 can extract or generate an audio representation by using one or more predictive models (e.g., a fully convolutional neural network) that can be used to encode a stereo audio signal associated with the content into an audio representation that corresponds to a sound associated with the stereo audio signal or otherwise represents the stereo audio signal.

In some examples, a visual representation generated by the video encoder engine 120 or an audio representation generated by the audio encoder engine 122 can indicate a position or location of a sound source in the content. For instance, the video encoder engine 120 can analyze the frame of the virtual reality environment that includes the virtual character making a sound and the audio encoder engine 122 can analyze stereo audio signals corresponding to the frame and generate an audio representation. In this example, the visual representation or the audio representation can indicate that the frame includes the virtual character and the location or position of the sound source (e.g., the position or location of the virtual character within the virtual reality environment).

The ambisonic synthesizer engine 124 can be electrically or communicatively coupled to the video encoder engine 120 and the audio encoder engine 122. The ambisonic synthesizer engine 124 can access data on the video encoder engine 120 or the audio encoder engine 122. In another example, the ambisonic synthesizer engine 124 receives or obtains data from the video encoder engine 120 or the audio encoder engine 122. In some embodiments, the ambisonic synthesizer engine 124 can generate one or more spatial audio signals based on a visual representation generated by the video encoder engine 120, an audio representation generated by the audio encoder engine 122, and/or the audio data associated with the content.

For example, various visual representations generated by the video encoder engine 120 and various corresponding audio representations generated by the audio encoder engine 122 can be input into the ambisonic synthesizer engine 124. In this example, the audio data (e.g., stereo audio data) associated with the content can also be input into the ambisonic synthesizer engine 124. In some examples, the ambisonic synthesizer engine 124 can separate the audio data into various individual stereo audio signals. For instance, if a portion of the audio data includes different stereo audio signals corresponding to various virtual characters speaking in the virtual reality environment, the ambisonic synthesizer engine 124 can separate the various stereo audio signals into individual stereo audio signals (e.g., separate each stereo audio signal or group of stereo audio signals corresponding to each character speaking).

The ambisonic synthesizer engine 124 can determine or predict a weight (e.g., a weight value) to be applied to each stereo audio signal. In some examples, a visual representation generated by the video encoder engine 120 or an audio representation generated by the audio encoder engine 122 can indicate a position or location of a sound source in the content. For instance, the video encoder engine 120 can analyze the frame of the virtual reality environment that includes the character making a sound and the audio encoder engine 122 can analyze stereo audio signals corresponding to the frame and generate an audio representation. In this example, the visual representation or the audio representation can indicate that the frame includes the character and the location or position of the sound source (e.g., the position or location of the virtual character within the virtual reality environment).

In some examples, the ambisonic synthesizer engine 124 determines or predicts a weight to be applied to a stereo audio signal based on a location or position of a source of a sound associated with the stereo audio signal (e.g., a position or location of the sound source indicated by a visual or audio representation associated with the stereo audio signal). In some examples, the determined or predicted weight can be a weight that, when applied to the stereo audio signal, the weighted stereo audio signal, when played, can be perceived as originating from the location or position of the source of the sound that corresponds to the stereo audio signal. For instance, if the stereo audio signal is associated with a sound made by a character positioned in front of the user in a three-dimensional video, the ambisonic synthesizer engine 124 can determine a weight to be applied to a corresponding audio signal such that the weighted stereo audio signal, when played can be perceived as originating from the location of the source of the sound that corresponds to the stereo audio signal (e.g., perceived as originating from in front of the user).

While in this example, the ambisonic synthesizer engine 124 is described as generating three-dimensional audio signals (e.g., spatial audio signals) by determining or predicting a weight to be applied to a stereo audio signal and applying the weight value to the stereo audio signal, the present disclosure is not limited to such configurations. Rather, in some embodiments, the ambisonic synthesizer engine 124 can directly generate a three-dimensional audio signal by predicting or determining the three-dimensional audio signal based on a stereo, mono, or one-dimensional audio signal without determining a weight value to be applied to the stereo, mono, or one-dimensional audio signal (e.g., by directly converting the stereo, mono, or one-dimensional audio signal into the three-dimensional audio signal without determining the weight value).

In some examples, the spatial audio system 102 can augment the content by adding the generated spatial audio signals to the content, embedding the spatial audio signals into the content, or otherwise associating spatial audio signals with the content. For example, the spatial audio system 102 augments the virtual reality environment by associating the virtual reality environment with a spatial audio file that includes one or more spatial audio signals corresponding to various frames of the virtual reality environment, which allows the virtual reality environment to be aurally enhanced for a user if the user is viewing or interacting with the virtual reality environment. For instance, as the user interacts with the virtual reality environment, various sounds from characters or elements within the virtual reality environment can be output (e.g., via a virtual reality device or any user device) as spatial sounds such that the sounds can be perceived by the user as originating from the position or location of the characters or elements within the virtual reality environment.

In some examples, the spatial audio system 102 can use a generated spatial signal to train a machine-learning algorithm to generate spatial audio signals based on a content input. For instance, the spatial audio system 102 can receive or obtain data indicating content that can be provided to a user such as, for example, a virtual reality environment. The spatial audio system 102 can also obtain or receive data indicating stereo audio signals associated with the content. The spatial audio system 102 can generate one or more spatial audio or ambisonic signals for the content based on the stereo audio signals associated with the content in substantially the same manner as described above. The spatial audio system 102 can then obtain or receive data indicating measured (e.g., ground-truth) spatial audio signals for the content (e.g., spatial audio signals captured using one or more devices). For example, the spatial audio system 102 can obtain or receive data indicating measured spatial audio signals for the content from the computing device 104, the user device 110, via user input (e.g., if a user programs the spatial audio system to include the data), the data storage unit 112, or any other source. In this example, the spatial audio system 102 can train the machine-learning algorithm using the generated spatial audio signals and the measured spatial audio signals.

For example, the spatial audio system 102 uses one or more algorithms, functions, etc. to train the machine-learning algorithm to generate spatial audio signals. As an example, the spatial audio system 102 can train the machine-learning algorithm to compare the generated spatial audio signals to the measured spatial audio signals. In this example, the spatial audio system 102 trains the machine-learning algorithm to use a function or algorithm to learn to generate spatial audio signals based on the comparison. For instance, the spatial audio system 102 trains the machine-learning algorithm to use a loss function, such as, for example, a means-squared error function that minimizes the average squared error between an output (e.g., a generated spatial audio signal) and a target output (e.g., a measured spatial or audio signal), a frequency domain function, etc. In this example, the spatial audio system 102 can train the machine-learning algorithm such that content, along with stereo audio signals associated with the content, can be input into the machine-learning algorithm and the machine-learning algorithm can automatically generate and output a spatial audio signal for the content that is approximately the same or substantially similar to a measured spatial signal for the content.

In the example depicted in FIG. 2, a user can interface with the one or more user devices 110 to access the spatial audio system 102. In some embodiments, each of the user devices 110 represents various types of devices. For example, the user device 110 is a mobile device (e.g., a mobile telephone, a smartphone, a PDA, a tablet, a laptop, a camera, a tracker, a watch, a wearable device, etc.). The user device 110, however, in some embodiments, is a non-mobile device (e.g., a desktop computer or another type of client device). In some embodiments, the spatial audio system 102 is executed on the one or more user devices 110 via a spatial audio generation application 140. In this example, the user device 110 includes one or more components of the spatial audio system 102.

In some examples, a user can interface with user devices 110 to access data generated using the spatial audio system 102. For instance, a user can interface with the user devices 110 to access augmented visual content generated using the spatial audio system 102 (e.g., visual content that includes spatial audio). As an example, the user device 110 can obtain or receive data indicating augmented visual content from the computing device 104 via the data network 108. In this example, the user can interact with or view the augmented visual content and as the user views or interacts with the augmented visual content, the spatial audio can be output such that various sounds from visual elements in the augmented visual content can be perceived by the user as originating from the visual position or location of the visual elements within the augmented visual content.

Although the exemplary environment 100 of FIG. 2 is depicted as having a certain number of components, in other embodiments, the exemplary environment 100 has any number of additional or alternative components. Further, while FIG. 2 illustrates a particular arrangement of the computing device 104, the spatial audio system 102, user devices 110, and the data storage unit 112, various additional arrangements are possible. As an example, while FIG. 2 illustrates data storage unit 112 and the spatial audio system 102 as part of separate systems, in some embodiments, the data storage unit 112 and the spatial audio system 102 are part of a single system. As another example, while FIG. 2 illustrates the video encoder engine 120, the audio encoder engine 122, and the ambisonic synthesizer engine 124 as separate engines, in some embodiments, the audio encoder engine 122, and the ambisonic synthesizer engine 124 are part of a single engine or predictive model. Furthermore, while the spatial audio system 102 of FIG. 2 is described as generating three-dimensional audio signals (e.g., spatial audio signals) by converting stereo, mono, or one-dimensional audio signals to spatial audio signals, the present disclosure is not limited to such configurations. Rather, in some embodiments, the spatial audio system 102 can execute the engines 120, 122, 124 to generate high order three-dimensional audio signals by converting low order three-dimensional audio signals to high order three-dimensional audio signals. As an example, the spatial audio system 102 can execute the engines 120, 122, 124 to generate high order three-dimensional audio signals (e.g., second order or high resolution ambisonic or spatial audio signals) by converting mono audio (e.g., zero order or low resolution ambisonic or spatial audio signals) to high order three-dimensional audio signals (e.g., second order or high resolution ambisonic or spatial audio signals). As another example, the spatial audio system 102 can execute the engines 120, 122, 124 to generate second order spatial audio signals (e.g., high resolution ambisonic or spatial audio signals) by converting first order spatial audio (e.g., low resolution ambisonic or spatial audio signals) to second order spatial audio signals.

Figure 4:
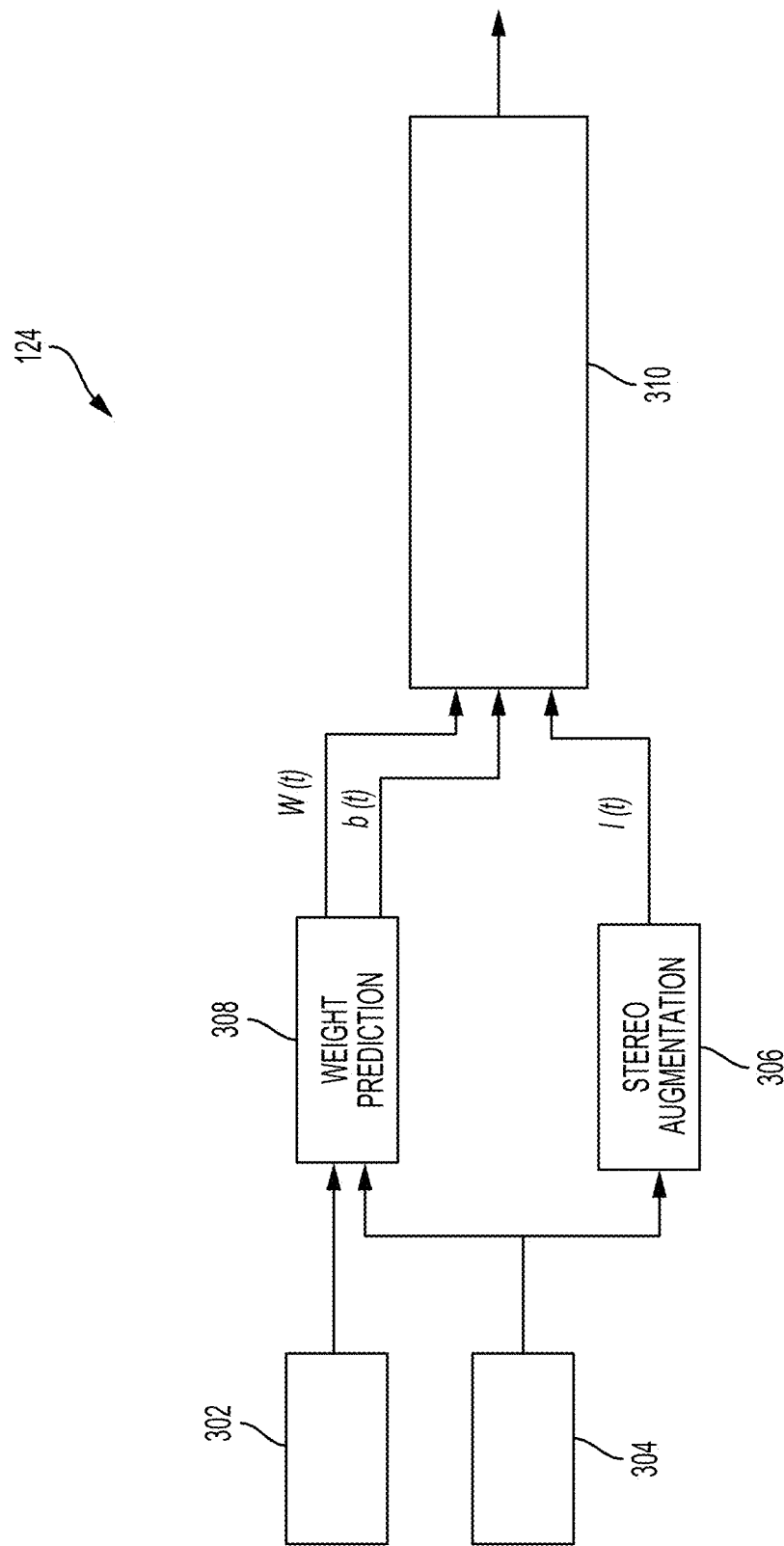
FIG. 4 is a block diagram of an exemplary ambisonic synthesizer engine for generating spatial audio signals in accordance with one or more embodiments.
Figure 5:
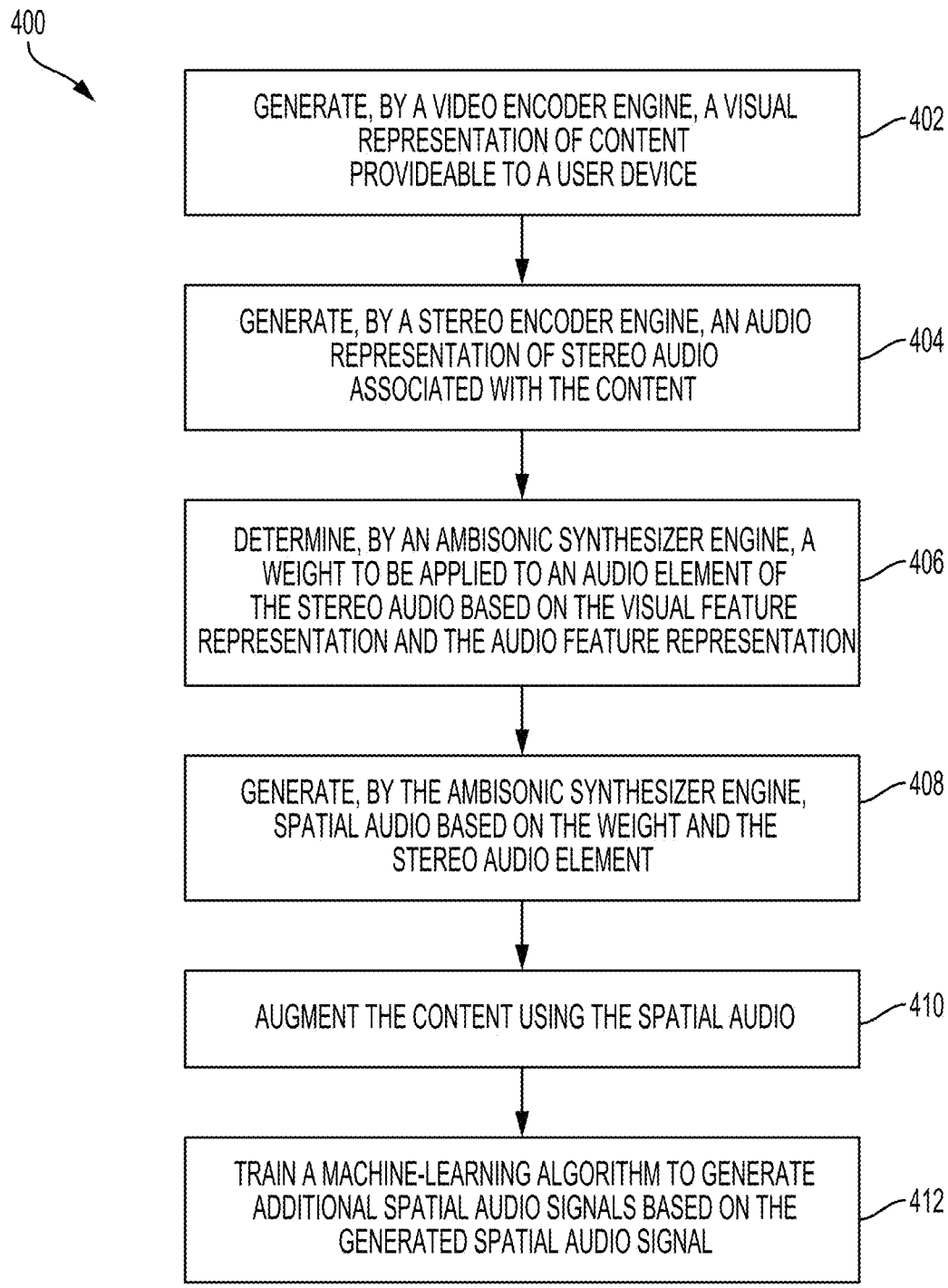
FIG. 5 is a flow chart depicting an example of a process for generating spatial audio signals in accordance with one or more embodiments.

FIG. 5 is a flow chart depicting an example of a process 400 for generating spatial audio signals in accordance with one or more embodiments. In some embodiments, one or more processing devices such as, for example, the computing system described herein with respect to FIG. 6, implement operations depicted in FIG. 5 by executing suitable program code (e.g., the spatial audio system 102 of FIG. 2) that implements one or more algorithms encompassed by the process 400. For illustrative purposes, the process 400 is described with reference to the examples depicted in FIGS. 1-4, but other implementations are possible.

In block 402, a visual representation of visual content that can be provided to a user device (e.g., the user device 110) is generated. In some embodiments, one or more processing devices execute a video encoder engine 120 to generate a visual representation of the visual content. In some embodiments, the computing device 104 executes the spatial audio system 102. The spatial audio system 102 includes the video encoder engine 120, which can each be executed on the computing device 104.

For example, a spatial audio generation application 140 causes the spatial audio system 102 to obtain (e.g., receive) content data 114 indicating visual content to be provided to a user device. In some examples, the spatial audio generation application 140 causes the spatial audio system to obtain the content data 114 from the data storage unit 112, the user device 110, via user input (e.g., if a user programs the computing device 104 to include the content data 114), or any other source. The content data 114 includes data indicating content that can be provided to a user such as, for example, visual content (e.g., a virtual reality environment, an augmented reality environment, a three-dimensional video, etc.).

In some embodiments, the video encoder engine 120 includes one or more instructions stored on a computer-readable storage medium and executable by processors of the computing device 104. When executed by the one or more processors, the computer-executable instructions cause the video encoder engine 120 to generate a visual representation of content. In some examples, a visual representation of the visual content describes, indicates, or otherwise represents elements of the visual content.

For example, the video encoder engine 120 receives content data 114 indicating various frames of a three-dimensional video that can be provided to a user. The video encoder engine 120 analyzes one or more of the frames and generates a visual representation of the frame that describes, indicates, or otherwise represents elements (e.g., visual elements) in the frame. As an example, a frame of a virtual reality environment includes a character and the video encoder engine 120 analyzes the frame and generates a visual representation of the frame that indicates that the frame includes the character. In some examples, a visual representation generated by the video encoder engine 120 in block 402 can indicate a position or location of an element in the content. As an example, the video encoder engine 120 can analyze the frame of the three-dimensional video that includes the character and generate a visual representation that indicates that the frame includes the character and the location or position of the character within the frame or the three-dimensional video. In some examples, in block 402, the video encoder engine 120 can analyze the content on a frame-by-frame basis and extract or generate 2048-dimensional visual representations.

In some examples, in block 402, the video encoder engine 120 can extract or generate a visual representation of the visual content or a frame of the visual content by using one or more predictive models (e.g., a neural network, deep learning model, etc.) that can be used to encode the visual content or the frame of the visual content into a visual representation that indicates or describes elements in the visual content or frame. A neural network is a machine-learning model that uses statistical learning algorithms that are used to estimate or approximate functions that depend on a large number of inputs in a non-linear, distributed, and parallel manner. A computer learning neural network is an interconnected group of nodes, called neurons. A neural network includes input nodes, output nodes, and intermediary nodes. In some embodiments, the connections between each node are weighted with a set of adaptive weights that are tuned by a learning algorithm, and are capable of approximating non-linear functions of their inputs. In some embodiments, the machine-learning application trains a neutral network to learn how to correctly classify content items.

A non-limiting example of a neural network is a convolutional neural network (CNN). When used for image or frame recognition, a CNN consists of multiple layers of small neuron collections that look at small portions of the input image or frame at a time. The results of these collections are then tiled to overlap, which provides a better representation of the original image or frame. A CNN with multiple intermediary layers is referred to as a deep convolutional neural network (DCNN).

In block 404, an audio representation of stereo audio associated with the visual content is generated. In some examples, the spatial audio generation application 140 causes a audio encoder engine 122 to generate an audio representation of stereo audio associated with the visual content. In some embodiments, the audio encoder engine 122 includes one or more instructions stored on a computer-readable storage medium and executable by processors of the computing device 104. When executed by the one or more processors, the computer-executable instructions cause the audio encoder engine 122 to generate an audio representation of stereo audio associated with the visual content. In some examples, an audio representation of the stereo audio describes, indicates, or otherwise represents a stereo audio signal, a sound in the content, or an audio element of the stereo audio.

For example, the audio encoder engine 122 receives or obtains stereo audio associated with the visual content from the data storage unit 112, the user device, via user input (e.g., if a user programs the computing device 104 to include the audio data), or any other source. The stereo audio (e.g., stereo audio data or file) associated with the visual content can indicate one or more stereo signals or sounds in the visual content. The audio encoder engine 122 can analyze the stereo audio associated with the visual content and extract or generate one or more audio representations based on the stereo audio. For example, the audio encoder engine 122 receives content data 114 indicating various stereo audio signals associated with various frames of the three-dimensional video. The audio encoder engine 122 analyzes one or more of the stereo audio signals and generates an audio representation of the stereo audio signal that describes, indicates, or otherwise represents the stereo audio signal or a sound associated with the stereo audio signal. As an example, the audio encoder engine 122 receives data indicating a stereo audio signal associated with the three-dimensional video and the stereo audio signal corresponds to the character making a sound in the virtual three-dimensional video. The audio encoder engine 122 can analyze the stereo audio signal and generate an audio representation of the stereo audio signal that indicates that the stereo audio signal corresponds to the character making a sound.

In some examples, the audio encoder engine 122 can extract or generate an audio representation by using one or more predictive models (e.g., a fully convolutional neural network) that can be used to encode a stereo audio signal associated with the visual content into an audio representation that corresponds to a sound associated with the stereo audio signal or otherwise represents the stereo audio signal.

Figure 3:
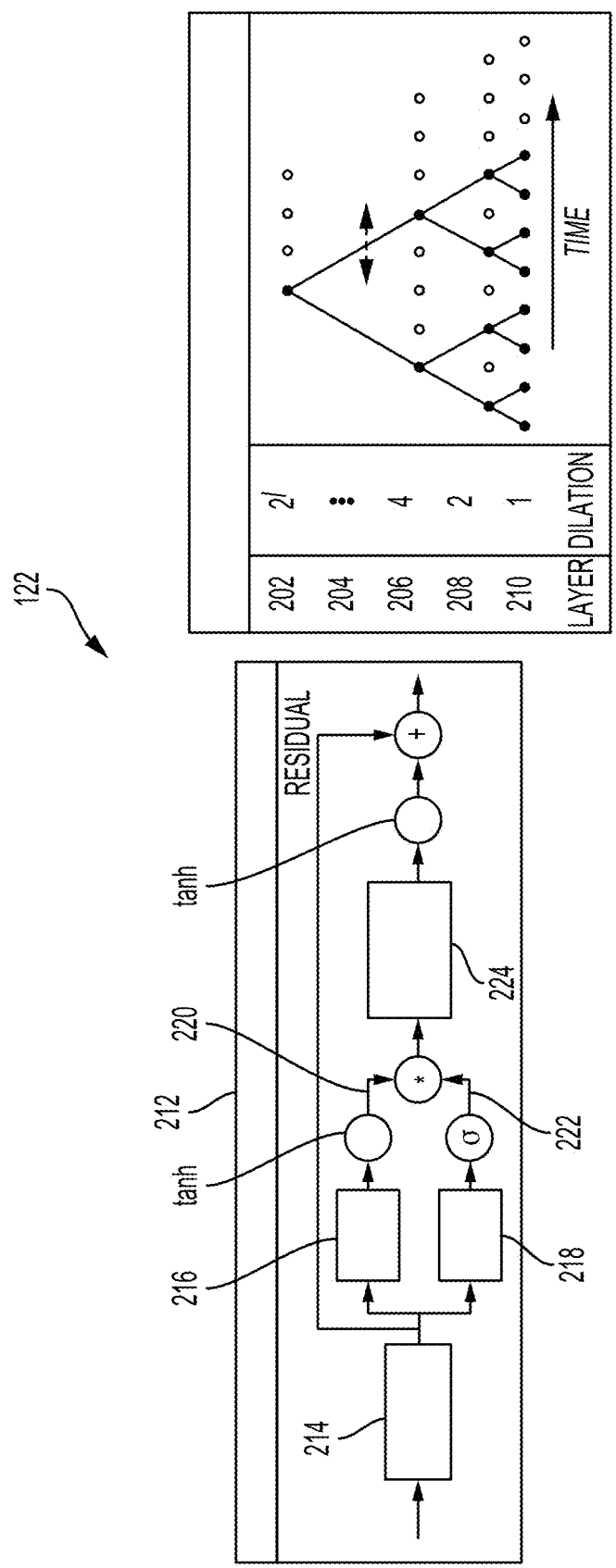
FIG. 3 is a block diagram of an exemplary audio encoder engine for generating spatial audio signals in accordance with one or more embodiments.

For example, FIG. 3 is a block diagram of an exemplary audio encoder engine 122 for generating spatial audio signals in accordance with one or more embodiments.

In this example, the audio encoder engine 122 can include various stacked layers 202, 204, 206, 208, 210. In this example, each layer 202, 204, 206, 208, 210 can include a stereo encoder device 212.

The stereo encoder device 212 can include a convolutional kernel 214 that is configured to receive a stereo audio signal as an input. The convolutional kernel 214 can receive the stereo audio signal and augment the stereo audio signal. For example, the convolutional kernel 214 can be a convolutional layer with a kernel size of 1×1 that augments a number of channels of a tensor of the audio signal.

The stereo encoder device 212 also includes stacked dilated convolutional kernels 216, 218, which can receive the augmented stereo audio signal from the convolutional kernel 214. In some embodiments, each stacked convolutional kernel 216, 218 can include eleven layers and have a kernel size of two and dilations that can double at each layer. The stacked convolutional kernels 216, 218 can receive the augmented stereo audio signal from the convolutional kernel 214 and form a filter signal 220 and a gate signal 222, respectively. In some embodiments, the filter signal 220 and gate signal 222 can be combined according to one or more algorithms, methods, or techniques. For example, the filter signal 220 and gate signal 222 can be combined according to the following equation:

$$u(t) = \tan h(f(t)) * \sigma(g(t))$$

In the equation above, f(t) represents the filter signal 220 and g(t) represents the gate signal 222.

In some examples, the stereo encoder device 212 also includes another convolutional kernel 224 that can be configured in substantially the same manner as the convolutional kernel 214, although it need not be. The convolutional kernel 224 can receive an output u(t) that represents the combination of the filter signal 220 and the gate signal 222 and filter the output u(t). In some examples, the stereo encoder device 212 can include a residual link, which can be defined to match corresponding frames in time.

In some examples, convolutional kernels of the stereo encoder device 212 can be applied without padding, which can reduce a signal dimension of a stereo audio signal.

Returning to FIG. 5, in block 406, a weight to be applied to an audio element (e.g., a stereo signal) of the stereo audio data is determined based on the visual representation and the audio representation (e.g., the visual and audio representations generated in blocks 402 and 404). In some examples, the spatial audio generation application 140 causes an ambisonic synthesizer engine 124 to determine a weight to be applied to an audio element of the stereo audio based on the visual representation and the audio representation. In some embodiments, the ambisonic synthesizer engine 124 includes one or more instructions stored on a computer-readable storage medium and executable by processors of the computing device 104. When executed by the one or more processors, the computer-executable instructions cause the ambisonic synthesizer engine 124 to determine a weight to be applied to an audio element of the stereo audio based on the visual representation and the audio representation.

For example, the ambisonic synthesizer engine 124 can be electrically or communicatively coupled to the video encoder engine 120 and the audio encoder engine 122. The ambisonic synthesizer engine 124 can access data on the video encoder engine 120 or the audio encoder engine 122. In another example, the ambisonic synthesizer engine 124 receives or obtains data from the video encoder engine 120 or the audio encoder engine 122. In some embodiments, the ambisonic synthesizer engine 124 can generate one or more spatial audio signals based on a visual representation generated by the video encoder engine 120, an audio representation generated by the audio encoder engine 122, and/or the stereo audio associated with the visual content.

As an example, various visual features generated by the video encoder engine 120 and various corresponding audio features generated by the audio encoder engine 122 can be input into the ambisonic synthesizer engine 124, along with stereo audio associated with the visual content. In some examples, the ambisonic synthesizer engine 124 can separate the stereo audio into various individual stereo audio signals. For instance, if a portion of the stereo audio data includes different stereo audio signals corresponding to various characters speaking in a three-dimensional video, the ambisonic synthesizer engine 124 can separate the various stereo audio signals into individual stereo audio signals (e.g., separate each stereo audio signal or group of stereo audio signals corresponding to each character speaking).

The ambisonic synthesizer engine 124 can determine or predict a weight (e.g., a weight value) to be applied to each stereo audio signal. In some examples, the ambisonic synthesizer engine 124 determines or predicts a weight to be applied to a stereo audio signal based on a location or position of a source of a sound associated with the stereo audio signal (e.g., a position or location of the sound source indicated by a visual or audio representation associated with the stereo audio signal). In some examples, the determined or predicted weight can be a weight that, when applied to the stereo audio signal, the weighted stereo audio signal, when played, can be perceived as originating from the location or position of the source of the sound that corresponds to the stereo audio signal. For instance, if the stereo audio signal is associated with a sound made by a virtual character positioned behind the user in the three-dimensional video, the ambisonic synthesizer engine 124 can determine a weight to be applied to a corresponding audio signal such that the weighted stereo audio signal, when played, can be perceived as originating from the location of the source of the sound that corresponds to the stereo audio signal (e.g., perceived as originating from behind the user).

Figure 7:
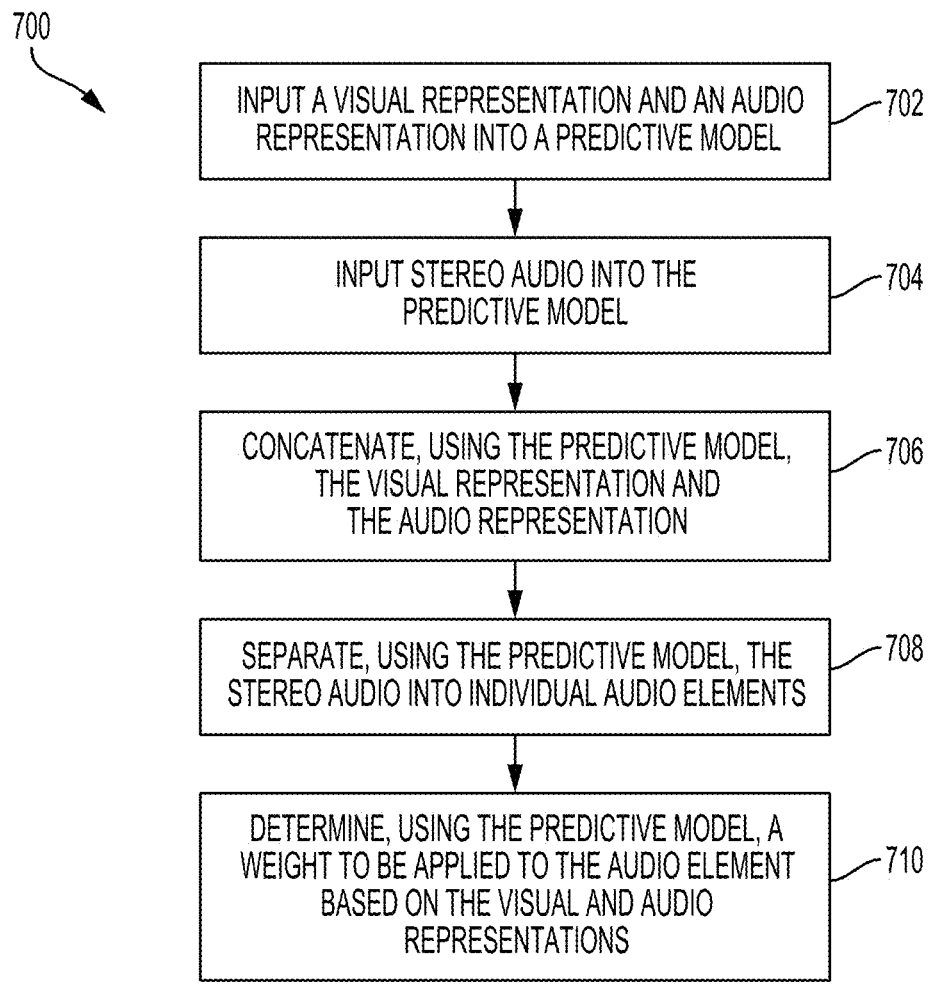
FIG. 7 is a flow chart depicting an example of a process for generating spatial audio signals in accordance with one or more embodiments.

For example, and with reference to FIGS. 4 and 7. FIG. 4 is a block diagram of an exemplary ambisonic synthesizer 124 engine for generating spatial audio signals in accordance with one or more embodiments. FIG. 7 is a flow chart depicting an example of a process 700 for generating spatial audio signals in accordance with one or more embodiments.

In this example, one or more content features 302 (e.g., visual representations or audio representations) generated by the video encoder engine 120 or the audio encoder engine 122 can be input into the ambisonic synthesizer 124, along with stereo audio data 304 (e.g., stereo audio data associated with the content). For example, the content features 302 can be input into the ambisonic synthesizer 124 in block 702 of FIG. 7 and the stereo audio data 304 can be input into the ambisonic synthesizer 124 in block 704 of FIG. 7.

In some embodiments, a number of content features 302 extracted from the stereo and video elements of the content can be concatenated together in a tensor of one or more sizes such as, for example, a tensor of size $T \times (d_s + d_v)$ where T is the number of frames in the content and $d_s + d_v$ represent the number of audio representations and visual representations extracted from the content, respectively. For example, the ambisonic synthesizer 124 can concatenate the visual features and audio features input into the ambisonic synthesizer in block 706 of FIG. 7.

The ambisonic synthesizer engine 124 includes a stereo augmentation layer 306. The stereo augmentation layer 306 can be configured to receive stereo audio data 304 and separate the various stereo audio signals of the stereo audio data 304 into individual stereo audio signals as described above. The individual stereo audio signals can be concatenated with one or more skip connections or values to generate a stereo signal I(t). For example, the ambisonic synthesizer 124 can receive the stereo audio data 304 in block 704 of FIG. 7 and the ambisonic synthesizer 124 can separate the stereo audio data 304 into individual audio elements or signals in block 708 of FIG. 7.

The ambisonic synthesizer engine 124 can also include a weight prediction layer 308 that can be configured to determine or predict a weight W(t) or bias b(t) to be applied to a stereo audio signal based on a location or position of a source of a sound associated with the stereo audio signal as described above. In some examples, the weight W(t) or bias b(t) to be applied to a stereo audio signal can represent any algorithm, function, value, etc. that can be applied to a stereo audio signal. For instance, the ambisonic synthesizer 124 can determine or predict the weight W(t) or bias b(t) to be applied to an audio element (e.g., an individual stereo audio signal) based on a location or position of a source of a sound associated with the audio element that is indicated by the visual or audio representation in block 710 of FIG. 7.

Returning to FIG. 5, in block 408, a spatial audio signal is generated based on the weight W(t) or bias b(t) (e.g., the weight or bias determined in block 406) and the audio element (e.g., the audio element of block 404). In some examples, the spatial audio generation application 140 causes the ambisonic synthesizer engine 124 to generate the spatial audio signal based on the weight or bias and a stereo audio signal. In some embodiments, the ambisonic synthesizer engine 124 includes one or more instructions stored on a computer-readable storage medium and executable by processors of the computing device 104. When executed by the one or more processors, the computer-executable instructions cause the ambisonic synthesizer engine 124 to generate the spatial audio signal based on the weight and the stereo audio signal.

For example, the ambisonic synthesizer engine 124 applies one or more algorithms to a stereo audio signal and a corresponding weight or bias for the stereo audio signal to generate a spatial audio signal for the visual content (e.g., the stereo audio signal and corresponding weight value determined in block 406). An example of an algorithm that can be applied to a stereo audio signal and corresponding weight to generate a spatial audio signal includes, but is not limited to, a linear model. In some examples, in block 408, the ambisonic synthesizer associates the generated spatial audio with a visual element (e.g., sound source) in the content and the spatial audio signal can convey a perception or sensation of a location, depth, or position of the sound source in the visual content. For example, a spatial audio signal can convey a position or location of an element that is a source of sound in a three-dimensional video. In some embodiments, the ambisonic synthesizer engine 124 can apply the algorithm to the stereo audio signal and corresponding weight to generate a spatial audio signal (e.g., a three-dimensional audio signal or sound), which when played, can sound or be perceived as originating from a source at a particular location with respect to the user (e.g., originating from the location or position of the source of a sound corresponding to the audio signal).

For example, and with reference to FIG. 4, the ambisonic synthesizer engine 124 can include a model layer 310 that receives as an input the weight W(t) or bias b(t) to be applied to a stereo audio signal from the weight prediction layer 308, along with the stereo signal I(t) output from the stereo augmentation layer 306. The model layer 310 can apply one or more algorithms such as, for example, a linear model, to the stereo signal I(t) and a corresponding weight W(t) or bias b(t) for the stereo signal to generate a spatial audio signal.

Returning to FIG. 5, and with reference to FIG. 4, in some embodiments, in block 408, the ambisonic synthesizer engine 124 applies one or more algorithms to a stereo signal I(t) and a corresponding weight W(t) or bias b(t) to generate a spatial audio signal for the visual content. An example of an algorithm that can be applied to a stereo audio signal and corresponding weight to generate a spatial audio signal includes, but is not limited to, a linear model. For example, the ambisonic synthesizer engine 124 synthesizes the stereo signal I(t) and a corresponding weight W(t) and bias b(t) for the stereo signal I(t) by applying the following equation to the stereo signal I(t) and the corresponding weight W(t) and bias b(t) for the stereo signal I(t):

$$\hat{a}(t) = W^T(t)I(t) + b(t)$$

In some examples, the model layer 310 can include three stacked convolutional layers each with a kernel size of 1×1. In some examples, if $d_I$ is a number of channels in the input signal I(t), then W(t) can represent a matrix of size 4×$d_I$ and b(t) is a 4-dimensional vector. In this example, the last 1×1 convolutional layer can output 4×($d_I$+1) units, which can then be split and reshaped into various W and b tensors.

The spatial audio signal can convey a perception or sensation of a location, depth, or position of a sound source or visual element in the visual content. For example, a spatial audio signal can convey a position or location of a visual element that is a source of sound in a three-dimensional video. In some embodiments, the ambisonic synthesizer engine 124 can apply the algorithm to the stereo audio signal and corresponding weight or bias to generate a spatial audio signal (e.g., a three-dimensional audio signal or sound), which when played, can sound or be perceived as originating from a source at a particular location with respect to the user (e.g., originating from the location or position of the source of a sound corresponding to the audio signal).

In block 410, the visual content is augmented using the spatial audio signal. In some examples, the spatial audio generation application 140 causes the spatial audio system 102 to augment the visual content using the spatial audio signal.

For example, the spatial audio system 102 can augment the visual content by adding the generated spatial audio signal to the visual content, embedding the spatial audio signal into the visual content, or otherwise associating spatial audio signal with the visual content. For example, the spatial audio system 102 augments the three-dimensional video by associating the three-dimensional video with a spatial audio signal corresponding to a frame of the three-dimensional video, which allows the three-dimensional video to be aurally enhanced for a user if the user is viewing the three-dimensional video. For instance, as the user watches the three-dimensional video, various sounds from characters or visual elements within the three-dimensional video can be perceived by the user as originating from the position or location of the characters or elements within the three-dimensional video, which can allow the user to experience an immersive auditory sensation when viewing the three-dimensional video.

In block 412, a machine-learning algorithm is trained to generate additional spatial audio signals based on the generated spatial audio signal. In some examples, the spatial audio generation application 140 causes the spatial audio system 102 to train the machine-learning algorithm to generate spatial audio signals based on the generated spatial audio signal.

In some examples, the spatial audio system 102 can use a generated spatial signal to train a machine-learning algorithm to generate spatial audio signals based on a content input. For instance, the spatial audio system 102 can receive or obtain data indicating content that can be provided to a user such as, for example, a three-dimensional video. The spatial audio system 102 can also obtain or receive data indicating stereo audio signals associated with the content. The spatial audio system 102 can generate one or more spatial audio or ambisonic signals for the content based on the stereo audio signals associated with the content in substantially the same manner as described above. The spatial audio system 102 can then obtain or receive data indicating measured (e.g., ground-truth) spatial audio signals for the content (e.g., spatial audio signals captured using one or more spatial devices). For example, the spatial audio system 102 can obtain or receive data indicating measured spatial audio signals for the content from the computing device 104, the user device 110, via user input (e.g., if a user programs the spatial audio system to include the data), the data storage unit 112, or any other source. In this example, the spatial audio system 102 can train the machine-learning algorithm using the generated spatial audio signals and the measured spatial audio signals.

For example, the spatial audio system 102 uses one or more algorithms, functions, etc. to train the machine-learning algorithm to generate spatial audio signals. As an example, the spatial audio system 102 can train the machine-learning algorithm to compare the generated spatial audio signals to the measured spatial audio signals. In this example, the spatial audio system 102 trains the machine-learning algorithm to use a function or algorithm to learn to generate spatial audio signals based on the comparison. For instance, the spatial audio system 102 trains the machine-learning algorithm to use a loss function, such as, for example, a means-squared error function that minimizes the average squared error between an output (e.g., a spatial audio signal generated by the spatial audio system 102) and a target output (e.g., a measured spatial signal), a frequency domain function, etc. As an example, the spatial audio system 102 can train the machine-learning algorithm using the following means-squared error function on the temporal domain:

$$MSE_{raw(\hat{a},a)} = \sum_i \sum_t (\hat{a}_i(t) - a_i(t))^2$$

In the equation above, $\hat{a}_i(t)$ and $a_i(t)$ can represent the $i^{th}$ channel of the generated spatial audio signal and measured spatial audio signal, respectively.

In another example, the spatial audio system 102 can train the machine-learning algorithm using a frequency domain function. In this example, the spatial audio signal generated by the spatial audio system 102 and the measured spatial audio signal can be decomposed with a Short-Time Fourier Transform (STFT) using 25 millisecond (ms) Hann windows every 6.25 milliseconds. In this example, a distance between STFTs can be defined based on the following equation:

$$MSE_{raw}(\hat{A}_i, A_i) \sum_i \sum_t \sum_w |\hat{A}_i(t, w) - A_i(t, w)|^2$$

In some examples, the spatial audio system 102 can train the machine-learning algorithm such that content, along with stereo audio signals associated with the content can be input into the machine-learning algorithm and the machine-learning algorithm can automatically generate and output spatial audio signals for the content that is approximately the same or substantially similar to measured spatial signals for the content.

Figure 8:
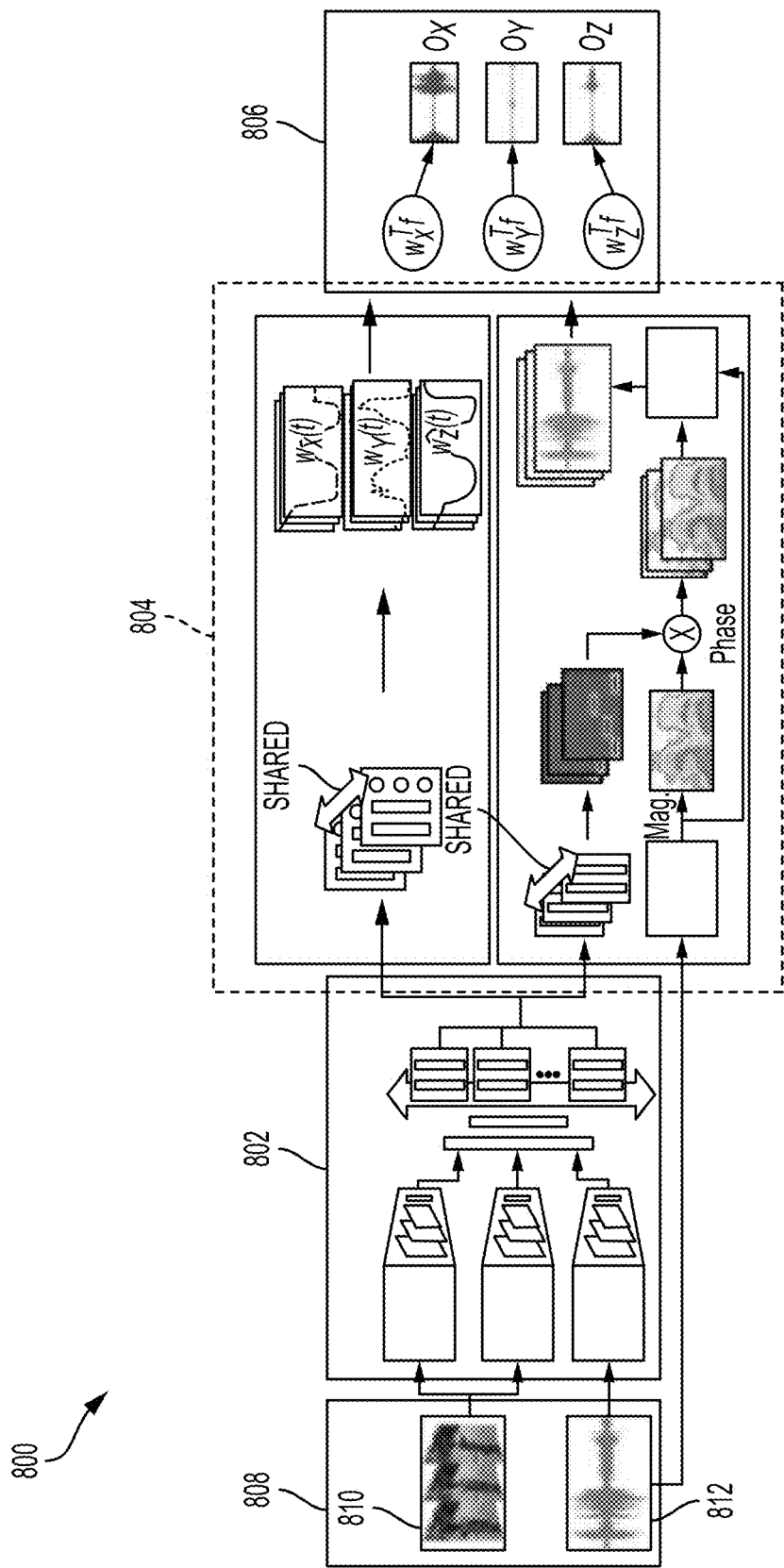
FIG. 8 is a block diagram of an exemplary spatial audio generation system that generates spatial audio signals in accordance with one or more embodiments.

FIG. 8 is a block diagram of an exemplary spatial audio generation system 800 that generates spatial audio signals in accordance with one or more embodiments.

The spatial audio generation system 800 (e.g., the spatial audio system 102 of FIG. 2) includes a content analysis engine 802, a localization and separation engine 804, and an encoding engine 806.

The content analysis engine 802, localization and separation engine 804, and encoding engine 806 can each include one or more instructions stored on a computer-readable storage medium and executable by processors of one or more computing devices. When executed by the one or more processors, the computer-executable instructions cause the spatial audio generation system 800 to generate spatial audio signals. In additional or alternative embodiments, the content analysis engine 802, localization and separation engine 804, and encoding engine 806 include hardware, such as a special purpose processing device to perform a certain function or group of functions. Additionally or alternatively, the content analysis engine 802, localization and separation engine 804, and encoding engine 806 each include a combination of computer-executable instructions and hardware.

In the example depicted in FIG. 8, the spatial audio generation system 802 can use the content analysis engine 802, localization and separation engine 804, and encoding engine 806 to generate spatial audio signals or predict first-order ambisonic (FOA) audio signals in one or more formats (e.g., Ambix format).

For example, the spatial audio generation system 800 can obtain (e.g., receive) content data 808. In some examples, the spatial audio generation system 800 can obtain the content data 808 from a computing device (e.g., the computing device 104 of FIG. 2), a user device (e.g., the user device 110 of FIG. 2), via user input (e.g., if a user programs the spatial audio generation system 802 to include the data), a database (e.g., the data storage unit 112 of FIG. 2), or any other source. The content data 808 can include content that can be provided to a user such as, for example, visual content data 810 (e.g., a three-dimensional or a 360 degree video) and an audio data or file 812 associated with the visual content 810. The audio data 812 associated with the visual content data 810 can indicate one or more stereo, mono, or non-spatial audio signals or sounds associated or synchronized the visual content 810. In some examples, a visual frame of the visual content data 810 at a particular time t can be represented as v(t) and an audio frame of the audio data 812 that corresponds to the visual frame can be represented as i(t). In some instances, a visual frame of the visual content data 810 (e.g., a frame v(t)) and a corresponding audio frame of the audio data 812 (e.g., i(t)) can have different frame rates. As an example, the visual frame of the visual content data 810 can have a frame rate of 10 Hz and the corresponding audio frame of the audio data 812 can have a frame rate of 10 kHz.

In some embodiments, the content analysis engine 802 receives or obtains the content data 808 as an input. The content analysis engine 802 can analyze the audio data 812 in the content data 808 and extract or generate one or more audio representations based on the audio data 812. In some examples, an audio representation describes, indicates, or otherwise represents a stereo or mono audio signal, a sound in the audio data 812, or an audio element in the audio data 812.

For example, the content analysis engine 802 receives the audio data 812 and extracts an audio representation from a spectrogram of the audio data 812. As an example, the content analysis engine 802 extracts an audio representation from a sequence of short-term Fourier transform ("STFT") determined on 25 ms segments of the audio data 812 with a fifty-percent overlap, multiplied by one or more Hann window functions or algorithms. In some examples, the content analysis engine 804 extracts an audio representation from the spectrogram of the audio data 812 by applying a convolutional neural network ("CNN") on the spectrogram, which can generate an audio representation vector $h_s(t) \in \mathbb{R}^{d_s}$ for each audio frame at time t. In the audio representation vector $h_s(t) \in \mathbb{R}^{d_s}$, $d_s$ can represent an audio representation dimensionality (e.g., 256 or any other suitable audio representation dimensionality). In some instances, the content analysis engine 820 can determine an amount or number of simultaneous sound sources in the audio data 812. As an example, the content analysis engine 820 can determine that an audio frame at time t includes sixteen simultaneous sound sources. In another example, the content analysis engine 820 can determine that an audio frame at time t includes any amount or number of simultaneous sound sources.

Continuing with this example, the content analysis engine 802 can analyze the visual content data 810 in the content data 808 and extract or generate one or more visual representations based on the visual content data 810. In some examples, a visual representation describes, indicates, or otherwise represents visual elements of the visual content data 810.

For example, the content analysis engine 802 receives the visual content data 810 and extracts a visual representation from the visual content data 810 using a two-stream approach with one or more predictive models or neural networks (e.g., a Resnet-50 network) that can encode both RGB frames and optical flow. In some examples, the content analysis engine 802 can use a trained visual database configured for use in visual object recognition (e.g., ImageNet) that uses weight values to extract the visual representation. The content analysis engine 802 can tune the weight values and use the trained visual database to generate one or more visual representation vectors $h_v(t) \in \mathbb{R}^{d_v}$ and $h_f(t) \in \mathbb{R}^{d_f}$ for color and flow, respectively for each visual frame at time t. In the visual representation vectors $h_v(t) \in \mathbb{R}^{d_v}$ and $h_f(t) \in \mathbb{R}^{d_f}$, $d_v$ and $d_f$ can represent a visual representation dimensionality (e.g., 256 or any other suitable visual representation dimensionality).

In some embodiments, visual representations extracted from the visual content data 810 and audio representations extracted from the audio data 812 can be concatenated together using various methods or techniques, including, for example, by using nearest neighbor up-sampling methods on the visual representations. In some examples, the content analysis engine 802 can use the concatenated visual representations and audio representations to generate an embedded description $h_i(t) \in \mathbb{R}^d$ for each sound source in the audio data 812, where $i \in \{1, \ldots, k\}$ and d is a visual or audio representation dimensionality (e.g., 128 or any suitable dimensionality).

The localization and separation engine 804 can be electrically or communicatively coupled to the content analysis engine 802. The localization and separation engine 804 can receive an output of the content analysis engine 802 (e.g., a visual or audio representation). In this example, the audio data 812 can also be input into the localization and separation engine 804. In some examples, the localization and separation engine 804 can separate the audio data 812 into various individual audio signals. For instance, the localization and separation engine 804 can extract individual audio tracks $f_i(t)$ from the audio data 812 such that each individual audio track $f_i(t)$ includes one or more audio signals associated with an audio source described by $h_i$. In some examples, the localization and separation engine 804 can include one or more trainable predictive models that can be used to separate the audio data 812 into various individual audio signals by predicting frequency-domain attenuation coefficients applied to a Short-Time Fourier Transform (STFT). As an example, the localization and separation engine 804 can determine a frequency-domain attenuation coefficient using various methods or techniques such as, for example, a soft-attention technique $a_i(t, \omega)$ that can be determined from an embedded description $h_i(t)$ with a number of sigmoid activated outputs based on a number of frequency components in the STFT. In some examples, the localization and separation engine 804 can determine a modulated STFT for the $i^{th}$ source based on the following equation:

$$\Phi_i(t;\omega) = a_i(t,\omega) \cdot \Phi_i(t;\omega), \forall i = 1, \ldots, k, \forall t, f,$$

In this example, each individual audio track $f_i(t)$ can be reconstructed from the modulated STFTS $\Phi_i(t;\omega)$ using the inverse FFT and average fusion of overlapping windows. In some examples, a trainable predictive model or network of the localization and separation engine 804 can be trained to suppress one or more frequencies that are not associated with an audio source at a particular time t.

In some embodiments, the localization and separation engine 804 can receive, as an input, an embedded description $h_i(t)$ associated with a sound source i and generate (e.g., determine or predict) a weight $w_i(t) \in \mathbb{R}^{N_{out}}$ for each individual audio track $f_i(t)$ where $N_{out}$ is a number of channels that can be predicted by the localization and separation engine 804 (e.g., three channels or any suitable number of channels). In some instances, $w_i(t)$ can be interpreted as the spherical harmonics $y_N(\theta_i(t))$ evaluated at a position $\theta_i(t)$ of the $i^{th}$ audio sound source.

In some examples, the localization and separation engine 804 determines or predicts a weight to be applied to an individual audio signal or track $f_i(t)$ based on a location or position of a source of a sound associated with the audio signal or track $f_i(t)$ (e.g., a position or location of the sound source indicated by a visual or audio representation associated with the audio signal or track). In some examples, the determined or predicted weight can be a weight that, when applied to the audio signal or track $f_i(t)$, localizes the audio signal such that the weighted audio signal, when played, can be perceived as originating from the location or position of the source of the sound that corresponds to the audio signal.

The encoding engine 806 can be electrically or communicatively coupled to the localization and separation engine 804 and the encoding engine 806 can receive an output of the localization and separation engine 804. In this example, the encoding engine 806 can obtain or receive a weight $w_i(t)$ determined by the localization and separation engine 804 and each individual audio track $f_i(t)$. The encoding engine 806 can then encode each individual audio signal or track $f_i(t)$ into an ambisonic audio signal for a particular time t in the content data 808 using the following equation:

$$\phi_i(t) = \sum_{i=1}^{k} w_i(t) f_i(t)$$

In some examples, an individual audio signal or track $f_i(t)$ can be equivalent to the $0^{th}$-order ambisonics, $\emptyset_w$. In this example, the encoding engine 806 can encode each individual audio signal or track $f_i(t)$ into an ambisonic audio signal by synthesizing one or more first order components or coefficients $\emptyset_x, \emptyset_y, \emptyset_z$ of the audio signal or track $f_i(t)$.

In some examples, the spatial audio generation system 800 can use a generated ambisonic audio signal to train a machine-learning algorithm to generate ambisonic audio signals. For instance, the spatial audio generation system 800 can receive or obtain data indicating content that can be provided to a user such as, for example, a three-dimensional video. The spatial audio generation system 800 can also obtain or receive data indicating audio signals (e.g., stereo or mono audio signals) associated with the content. The spatial audio generation system 800 can generate one or more spatial audio or ambisonic signals for the content based on the audio signals associated with the content in substantially the same manner as described above. The spatial audio generation system 800 can then obtain or receive data indicating measured (e.g., ground-truth) ambisonic audio signals for the content (e.g., spatial audio signals captured using one more spatial devices). In this example, the spatial audio generation system 800 can train the machine-learning algorithm using the generated ambisonic audio signals and the measured ambisonic audio signals.

For example, the spatial audio generation system 800 uses one or more algorithms, functions, etc. to train the machine-learning algorithm to generate ambisonic audio signals. As an example, the spatial audio generation system 800 can use a generated ambisonic audio signal to train a machine-learning algorithm or predictive model to generate ambisonic audio signals based on a content input. For instance, the spatial audio generation system 800 can train the machine-learning algorithm using the following loss function:

$$MSE_{stft} = \sum_{k \in \{x,y,z\}} \sum_t \sum_w \left\| \Phi_k(t, \omega) - \hat{\Phi}_k(t, \omega) \right\|^2$$

In the equation above, $\|\cdot\|$ can be an euclidean complex norm. In some examples, the spatial audio generation system 80 can use the function above to train the machine-learning algorithm via back-propagation.

In another example, the spatial audio generation system 800 can train the machine-learning algorithm to learn to generate ambisonic audio signals by comparing the generated ambisonic audio signals to the measured ambisonic audio signals. For instance, the spatial audio generation system 800 trains the machine-learning algorithm to learn to generate ambisonic audio signals by comparing a distance (e.g., a Euclidean distance) between a previously generated ambisonic audio signal and a measured ambisonic audio signal. As an example, the spatial audio generation system 800 can train the machine-learning algorithm using the following log-spectral distance equation that measures a distance in decibels ("dB") between two spectrograms:

$$LSD = \sum_{k \in \{x,y,z\}} \sum_t \sqrt{\frac{1}{K} \sum_{\omega=1}^{K} \left( S(t, \omega) - \hat{S}_K(t, \omega) \right)^2}$$

In the equation above, K can represent a number of frequency components, $S_K(t, \omega) = 10 \log_{10} |\Phi_K(t, \omega)|$ the log-spectra of $\Phi_k$ and $\hat{S}_K(t, \omega)$ that of $\hat{\Phi}_k$.

As another example, the spatial audio generation system 800 can train the machine-learning algorithm to learn to generate ambisonic audio signals using the following equation:

$$E(\theta, t) = \sqrt{\frac{1}{T} \sum_{l \in w_t} f(\theta, l)^2} = \sqrt{\frac{1}{T} \sum_{l \in w_t} y_N^T(\theta) \phi_N(l)^2}$$

In the equation above, T is a window size and $E(\theta, t)$ can represent the directional energy map of $\emptyset_N(t)$. In this example, the spatial audio generation system 800 can determine the earth mover's distance (EMD) between energy maps $E(\theta, t)$ uniformly shaped over a sphere. In some instances, the EMD can take into account an angular distance of a measured (e.g., ground-truth) ambisonic audio signal and a generated ambisonic audio signal on a surface of a spherical map. In this example, the spatial audio generation system 800 can normalize the directional energy map to cause one or more sampled nodes to sum to one.

While in some examples described above, a spatial audio system is described as generating three-dimensional audio signals (e.g., spatial audio signals) by converting stereo or one-dimensional audio signals to spatial audio signals, the present disclosure is not limited to such configurations. Rather, in some embodiments, the spatial audio system can generate high order three-dimensional audio signals by converting low order three-dimensional audio signals to high order three-dimensional audio signals. As an example, the spatial audio system can generate high order three-dimensional audio signals (e.g., second order or high resolution ambisonic or spatial audio signals) by converting mono audio (e.g., zero order or low resolution ambisonic or spatial audio signals) to high order three-dimensional audio signals. As another example, the spatial audio system can generate second order spatial audio signals (e.g., high resolution ambisonic or spatial audio signals) by converting first order spatial audio (e.g., low resolution ambisonic or spatial audio signals) to second order spatial audio signals.

Furthermore, while in some examples described above, a spatial audio system is described as generating three-dimensional audio signals (e.g., spatial audio signals) by determining or predicting a weight to be applied to a stereo audio signal and applying the weight value to the stereo audio signal, the present disclosure is not limited to such configurations. Rather, in some embodiments, the spatial audio system can directly generate a three-dimensional audio signal by predicting or determining the three-dimensional audio signal based on a stereo, mono, or one-dimensional audio signal without determining a weight value to be applied to the stereo, mono, or one-dimensional audio signal (e.g., by directly converting the stereo, mono, or one-dimensional audio signal into the three-dimensional audio signal without determining the weight value).

System Implementation Example

Figure 6:
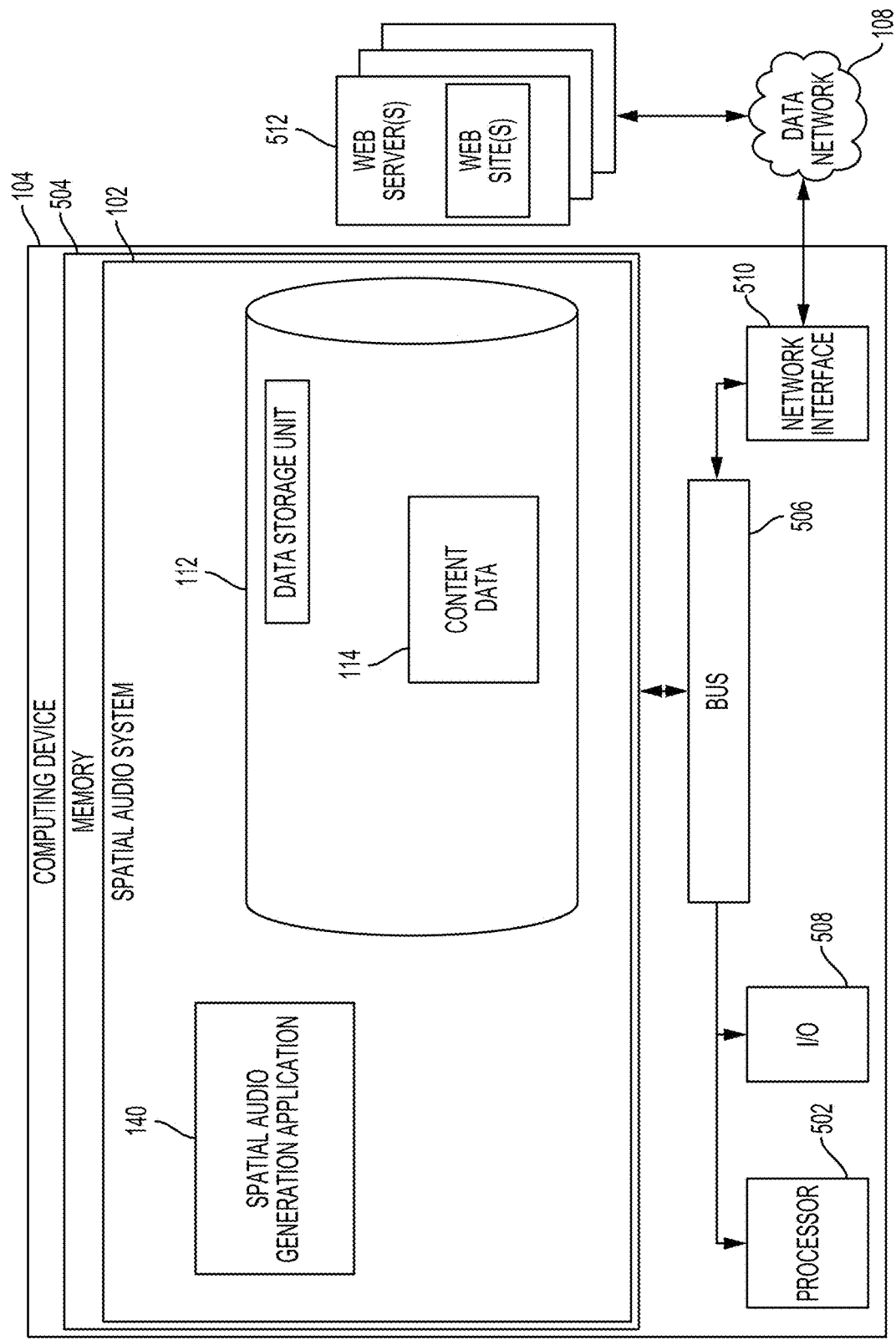
FIG. 6 is an example of a block diagram of a computing device that executes a spatial audio system to generate spatial audio signals in accordance with one or more embodiments.

Any suitable computing system or group of computing systems can be used for performing the operations described herein. FIG. 6 is an example of a block diagram of a computing device that executes a spatial audio system 102 to perform the operations described herein.

The depicted example of the computing device 104 includes one or more processors 502 communicatively coupled to one or more memory devices 504. The processor 502 executes computer-executable program code stored in the memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including one or more processors 502 that are configured by program code to implement the operations described above, such as the operations depicted in FIG. 5 that are described with respect to processing devices.

The memory device 504 includes any suitable non-transitory computer-readable medium for storing the spatial audio system 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. One or more memory devices 504 are used to implement the operations described above, such as the operations depicted in FIGS. 1-4 that are described with respect to one or more non-transitory computer-readable media.

The computing device 104 may also include a number of external or internal devices such as input or output devices. For example, the computing device 104 is shown with an input/output ("I/O") interface 508 that can receive input from input devices or provide output to output devices. A bus 506 can also be included in the computing device 104. The bus 506 can communicatively couple one or more components of the computing device 104. In some embodiments, the bus 506 is used to implement the operations described above with respect to FIGS. 1-4 that involve communicating signals via a data bus.

The computing device 104 executes program code that configures the processor 502 to perform one or more of the operations described above with respect to FIGS. 1-4. The program code includes, for example, the spatial audio generation application 140 or other suitable applications that perform one or more operations described herein. The program code may be resident in the memory device 504 or any suitable computer-readable medium and may be executed by the processor 502 or any other suitable processor. In some embodiments, the program code described above is stored in the memory device 504, as depicted in FIG. 6. In additional or alternative embodiments, the program code described above is stored in one or more memory devices accessible via a data network.

The computing device 104 accesses the content data 114 in any suitable manner. In some embodiments, the content data 114 is stored in one or more memory devices accessible via a data network 108. In additional or alternative embodiments, some or all of the content data 114 is stored in the memory device 504.

The computing device 104 depicted in FIG. 6 also includes at least one network interface 510. The network interface 510 includes any device or group of devices suitable for establishing a wired or wireless data connection to one or more data networks 108. Non-limiting examples of the network interface 510 include an Ethernet network adapter, a modem, and/or the like. The computing device 104 is able to communicate with one or more servers via the network interface 510. In some embodiments, the network interface 510 is used to implement the operations described above with respect to FIGS. 1-2 that involve communicating signals via a data network.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for generating spatial audio, wherein the method includes one or more processing devices performing operations comprising:

encoding visual content from a 360-degree video into a visual representation that indicates a visual element in the visual content;

encoding non-spatial audio associated with the 360-degree video into an audio representation that indicates an audio element in the non-spatial audio;

applying, to the visual representation and the audio representation, a predictive model that is trained to recognize relationships among training 360-degree video, training ambisonic audio, and training non-spatial audio corresponding to the training ambisonic audio, wherein applying the predictive model identifies an association between the audio element and the visual element, wherein training of the predictive model comprises:
- receiving data indicating content of the training 360-degree video;
- receiving data indicating the training non-spatial audio, wherein the training non-spatial audio comprises stereo audio signals associated with the content of the training 360-degree video;
- generating the training ambisonic audio for the content based on the stereo audio signals associated with the content;
- receiving data indicating ground-truth spatial audio associated with the content;
- training a machine-learning algorithm using the ground-truth spatial audio and the training ambisonic audio generated from the stereo audio signals; and
- generating spatial audio by modifying an intensity of the audio element with a weight based at least in part on the association between the audio element and the visual element; and
- augmenting the visual content using the spatial audio by at least associating the spatial audio with the visual content.

2. The method of claim 1 wherein the visual representation or the audio representation indicates a visual location of the visual element in the visual content, the method further comprising:
determining the weight to be applied to the audio element based on the visual location of the visual element.

3. The method of claim 1, wherein the visual representation or the audio representation indicates a visual location of the visual element and wherein generating the spatial audio comprises:
- generating the spatial audio based on the visual location of the visual element; and
- outputting the spatial audio such that the spatial audio is perceivable as originating from the visual location of the visual element.

4. The method of claim 1, wherein generating the spatial audio comprises:
applying a linear model to the audio element and the weight associated with the audio element.

5. The method of claim 1, wherein the non-spatial audio associated with the visual content comprises at least one of stereo audio or mono audio.

6. The method of claim 1, wherein the non-spatial audio associated with the visual content comprises first order spatial audio, the method further comprising converting the first order spatial audio to second order spatial audio.

7. A system comprising:
a processing device; and
a non-transitory computer-readable medium communicatively coupled to the processing device, wherein the processing device is configured to perform operations comprising:
- encoding visual content from a 360-degree video into a visual representation that indicates a visual element in the visual content;
- encoding non-spatial audio associated with the 360-degree video into an audio representation that indicates an audio element in the non-spatial audio;
- applying, to the visual representation and the audio representation, a predictive model that is trained to recognize relationships among training 360-video, training ambisonic audio, and training non-spatial audio corresponding to the training ambisonic audio, wherein applying the predictive model identifies an association between the audio element and the visual element, wherein the training of the predictive model comprises:
  - receiving data indicating content of the training 360-degree video;
  - receiving data indicating the training non-spatial audio, wherein the training non-spatial audio comprises stereo audio signals associated with the content of the training 360-degree video;
  - generating the training ambisonic audio for the content based on the stereo audio signals associated with the content;
  - receiving data indicating ground-truth spatial audio associated with the content;
  - training a machine-learning algorithm using the ground-truth spatial audio and the training ambisonic audio generated from the stereo audio signals;
- generating spatial audio by modifying an intensity of the audio element with a weight based at least in part on the association between the audio element and the visual element; and
- augmenting the visual content using the spatial audio by at least associating the spatial audio with the visual content.

8. The system of claim 7, wherein the visual representation or the audio representation indicates a visual location of the visual element in the visual content and the processing device is further configured to:
determine, using the predictive model, the weight to be applied to the audio element based on the visual location of the visual element.

9. The system of claim 7, wherein the visual representation or the audio representation indicates a visual location of the visual element and wherein the processing device is further configured to generate the spatial audio by performing operations comprising:
- generating the spatial audio based on the visual location of the visual element; and
- outputting the spatial audio such that the spatial audio is perceivable as originating from the visual location of the visual element.

10. The system of claim 7, wherein the processing device is further configured to generate the spatial audio by performing operations comprising:
applying, using the predictive model, a linear model to the audio element and the weight associated with the audio element.

11. The system of claim 7, wherein the non-spatial audio associated with the visual content comprises first order spatial audio, wherein the processing device is further configured to convert the first order spatial audio to second order spatial audio.

12. A non-transitory computer-readable medium storing program code executable by a processor for generating spatial audio, the program code comprising:

program code for generating encoding visual content from a 360-degree video into a visual representation that indicates a visual element in the visual content;

program code for encoding non-spatial audio associated with the 360-degree video into an audio representation that indicates an audio element in the non-spatial audio;

program code for applying, to the visual representation and the audio representation, a predictive model that is trained to recognize relationships among training 360-video, training ambisonic audio, and training non-spatial audio corresponding to the training ambisonic audio, wherein applying the predictive model identifies an association between the audio element and the visual element, wherein the training of the predictive model comprises:

receiving data indicating content of the training 360-degree video;

receiving data indicating the training non-spatial audio, wherein the training non-spatial audio comprises stereo audio signals associated with the content of the training 360-degree video;

generating the training ambisonic audio for the content based on the stereo audio signals associated with the content;

receiving data indicating ground-truth spatial audio associated with the content;

training a machine-learning algorithm using the ground-truth spatial audio and the training ambisonic audio generated from the stereo audio signals;

program code for generating spatial audio by modifying an intensity of the audio element based at least in part on the association between the audio element and the visual element; and program code for augmenting, by the processor, the visual content using the spatial audio by at least associating the spatial audio with the visual content.

13. The method of claim 1, wherein training the machine-learning algorithm using the ground-truth spatial audio and the training ambisonic audio generated from the stereo audio signals comprises iteratively modifying the machine-learning algorithm to minimize an average squared error between the training ambisonic audio and the ground-truth spatial audio, wherein the average squared error is computed with a means-squared error function.

14. The method of claim 13, wherein training the machine-learning algorithm using the ground-truth spatial audio and the training ambisonic audio generated from the stereo audio signals further comprises decomposing the training ambisonic audio and the ground-truth spatial audio with a short-time Fourier transform.

15. The method of claim 1, wherein generating the training ambisonic audio comprises:

determining an individual weight of an individual non-spatial audio track from the stereo audio signals; and encoding each non-spatial audio track from the stereo audio signals into ambisonic audio at a particular time frame of the individual non-spatial audio track.

16. The non-transitory computer-readable medium of claim 12, wherein training the machine-learning algorithm using the ground-truth spatial audio and the training ambisonic audio generated from the stereo audio signals comprises iteratively:

computing, with a means-squared error function, an average squared error between the training ambisonic audio and the ground-truth spatial audio, and modifying the machine-learning algorithm to reduce the average squared error.

17. The non-transitory computer-readable medium of claim 16 wherein training the machine-learning algorithm using the ground-truth spatial audio and the training ambisonic audio generated from the stereo audio signals further comprises decomposing the training ambisonic audio and the ground-truth spatial audio with a short-time Fourier transform.

18. The non-transitory computer-readable medium of claim 12, wherein generating the training ambisonic audio comprises:

determining an individual weight of an individual non-spatial audio track from the stereo audio signals; and encoding each non-spatial audio track from the stereo audio signals into ambisonic audio at a particular time frame of the individual non-spatial audio track.

* * * * *